(12) United States Patent
Hirata et al.

(10) Patent No.: US 10,980,063 B2
(45) Date of Patent: Apr. 13, 2021

(54) COMMUNICATION DEVICE AND COMMUNICATION CONTROL METHOD

(71) Applicant: SONY CORPORATION, Tokyo (JP)

(72) Inventors: Ryuichi Hirata, Kanagawa (JP); Yusuke Tanaka, Tokyo (JP); Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 5 days.

(21) Appl. No.: 16/462,409

(22) PCT Filed: Sep. 26, 2017

(86) PCT No.: PCT/JP2017/034716
§ 371 (c)(1),
(2) Date: May 20, 2019

(87) PCT Pub. No.: WO2018/116564
PCT Pub. Date: Jun. 28, 2018

(65) Prior Publication Data
US 2019/0306885 A1 Oct. 3, 2019

(30) Foreign Application Priority Data

Dec. 19, 2016 (JP) .............................. JP2016-245494

(51) Int. Cl.
*H04W 74/08* (2009.01)
*H04W 76/18* (2018.01)
(Continued)

(52) U.S. Cl.
CPC .......... *H04W 74/0825* (2013.01); *H04L 1/16* (2013.01); *H04L 1/1607* (2013.01); *H04L 69/22* (2013.01);
(Continued)

(58) Field of Classification Search
CPC . H04W 74/0825; H04W 84/12; H04W 28/04; H04W 74/08; H04W 76/18;
(Continued)

(56) References Cited

U.S. PATENT DOCUMENTS

2005/0068979 A1   3/2005   Boer et al.
2006/0285527 A1   12/2006  Gao et al.
(Continued)

FOREIGN PATENT DOCUMENTS

CN      101529774 A      9/2009
CN      102217364 A     10/2011
(Continued)

OTHER PUBLICATIONS

Extended European Search Report of EP Application No. 17882974.3, dated Dec. 4, 2019, 08 pages.
(Continued)

*Primary Examiner* — Afshawn M Towfighi
(74) *Attorney, Agent, or Firm* — Chip Law Group

(57) ABSTRACT

A communication device including a transmitting unit configured to perform transmission processing of a first signal, a receiving unit configured to perform reception processing of a second signal which responds to the first signal in a predetermined period determined by a time point of the transmission processing, and a determining unit configured to perform determination as to whether or not at least part of the first signal is correctly received at a transmission destination device on the basis of information acquired in process of the reception processing.

17 Claims, 25 Drawing Sheets

(51) Int. Cl.
*H04L 1/16* (2006.01)
*H04L 29/06* (2006.01)
*H04W 52/36* (2009.01)
*H04W 84/12* (2009.01)
*H04W 28/04* (2009.01)

(52) U.S. Cl.
CPC ......... *H04W 28/04* (2013.01); *H04W 52/365* (2013.01); *H04W 52/367* (2013.01); *H04W 74/08* (2013.01); *H04W 76/18* (2018.02); *H04W 84/12* (2013.01)

(58) Field of Classification Search
CPC .... H04W 52/365; H04W 52/367; H04L 1/16; H04L 1/1607; H04L 69/22; H04L 1/1692; H04L 1/188
See application file for complete search history.

(56) References Cited

U.S. PATENT DOCUMENTS

| | | | |
|---|---|---|---|
| 2010/0034156 A1 | 2/2010 | Malladi | |
| 2011/0222429 A1* | 9/2011 | Ito | H04L 27/2613 370/252 |
| 2016/0262173 A1* | 9/2016 | Josiam | H04B 7/0452 |
| 2017/0055279 A1* | 2/2017 | Janis | H04W 72/12 |

FOREIGN PATENT DOCUMENTS

| | | |
|---|---|---|
| CN | 104393955 A | 3/2015 |
| EP | 1519518 A2 | 3/2005 |
| EP | 2352329 A1 | 8/2011 |
| EP | 2595133 A1 | 5/2013 |
| EP | 3105987 A1 | 12/2016 |
| JP | 2005-110245 A | 4/2005 |
| JP | 2007-214920 A | 8/2007 |
| JP | 2007-329824 A | 12/2007 |
| JP | 2008-547326 A | 12/2008 |
| JP | 2010-508783 A | 3/2010 |
| JP | 2010-130118 A | 6/2010 |
| JP | 5173112 B2 | 3/2013 |
| JP | 2016-134894 A | 7/2016 |
| KR | 10-2009-0074272 A | 7/2009 |
| WO | 2007/002363 A2 | 1/2007 |
| WO | 2008/055222 A2 | 5/2008 |
| WO | 2010/061832 A1 | 6/2010 |
| WO | 2015/121529 A1 | 8/2015 |

OTHER PUBLICATIONS

International Search Report and Written Opinion of PCT Application No. PCT/JP2017/034716, dated Dec. 19, 2017, 10 pages of ISRWO.

* cited by examiner

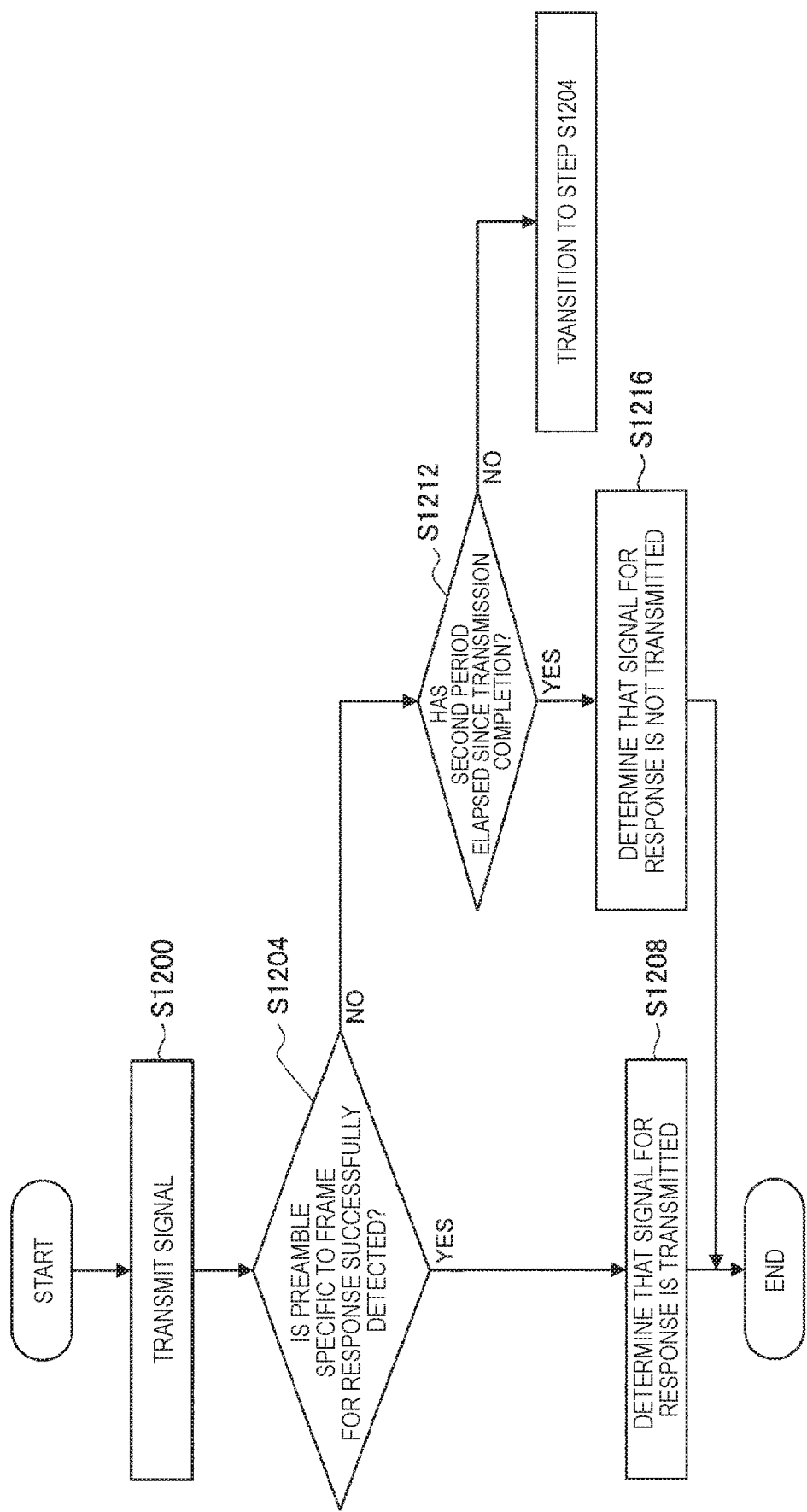

FIG. 8

| Rate | Reserved | Length | Parity | Tail | Service |
|------|----------|--------|--------|------|---------|
| 4bit | 1bit(f)  | 12bit  | 1bit   | 6bit | 16bit   |

FIG. 9

| Rate | Reserved | Response | Length | Parity | Tail | Service |
|---|---|---|---|---|---|---|
| 4bit | 1bit | 2bit | 10~12bit | 1bit | 6bit | 16bit |

FIG. 11

| | SS1 | SS2 | SS3 | SS4 | SS5 | SS6 | SS7 | SS8 |
|---|---|---|---|---|---|---|---|---|
| RU1 | ■ | | | | | | | |
| RU2 | | ■ | | | | | | |
| RU3 | | | ■ | | | | | |
| RU4 | | | | ■ | | | | |
| RU5 | | | | | ■ | | | |
| RU6 | | | | | | ■ | | |
| RU7 | | | | | | | ■ | |
| RU8 | | | | | | | | ■ |
| RU9 | | | | | | | | |

COMMUNICATION DEVICE AND COMMUNICATION CONTROL METHOD

CROSS REFERENCE TO RELATED APPLICATIONS

This application is a U.S. National Phase of International Patent Application No. PCT/JP2017/034716 filed on Sep. 26, 2017, which claims priority benefit of Japanese Patent Application No. JP 2016-245494 filed in the Japan Patent Office on Dec. 19, 2016. Each of the above-referenced applications is hereby incorporated herein by reference in its entirety.

TECHNICAL FIELD

The present disclosure relates to a communication device, a communication control method, and a program.

BACKGROUND ART

While, in a wireless LAN system which complies with IEEE 802.11, communication is performed using a frequency band for which a license is not required, there is a case where interference occurs due to influence by other systems which use a frequency band for which a license is not required. More specifically, in the case where a frequency band used by the wireless LAN system for communication overlaps with a frequency band used by other systems for communication, there is a case where signals transmitted from the respective systems interfere with each other. In recent years, various methods for reducing influence of such interference has been developed.

For example, Patent Literature 1 discloses a method for suppressing interference between a wireless LAN system which complies with IEEE 802.11 and a Zigbee system.

CITATION LIST

Patent Literature

Patent Literature 1: JP 2016-134894A

DISCLOSURE OF INVENTION

Technical Problem

Here, in the existing method, in the case of failure in reception processing of a signal which responds to a predetermined signal, it is impossible to determine whether or not at least part of the predetermined signal is normally received at a transmission destination device. For example, a case will be considered where a communication device transmits a data frame and receives an ACK frame from a transmission destination device. In the case where the communication device fails in reception processing (such as demodulation and decoding) of the ACK frame, even if the data frame is normally received at the transmission destination device, there is a case where the communication device may erroneously determine that the data frame is not received at the transmission destination device due to influence of interference, or the like. By this means, as a result of the communication device changing various kinds of parameters to reduce the influence of interference, there is a case where communication performance of a wireless LAN system may degrade.

Therefore, the present disclosure has been made in view of the above, and the present disclosure provides a new and improved communication device, communication control method and program which can determine whether or not at least part of a predetermined signal is correctly received at a transmission destination device even in the case of failure in reception processing of a signal which responds to the predetermined signal.

Solution to Problem

According to the present disclosure, there is provided a communication device including: a transmitting unit configured to perform transmission processing of a first signal; a receiving unit configured to perform reception processing of a second signal which responds to the first signal in a predetermined period determined by a time point of the transmission processing; and a determining unit configured to perform determination as to whether or not at least part of the first signal is correctly received at a transmission destination device on the basis of information acquired in process of the reception processing.

Moreover, according to the present disclosure, there is provided a communication control method to be executed by a computer, including: performing transmission processing of a first signal; performing reception processing of a second signal which responds to the first signal in a predetermined period determined by a time point of the transmission processing; and performing determination as to whether or not at least part of the first signal is correctly received at a transmission destination device on the basis of information acquired in process of the reception processing.

Moreover, according to the present disclosure, there is provided a program for causing a computer to realize: performing transmission processing of a first signal; performing reception processing of a second signal which responds to the first signal in a predetermined period determined by a time point of the transmission processing; and performing determination as to whether or not at least part of the first signal is correctly received at a transmission destination device on the basis of information acquired in process of the reception processing.

Moreover, according to the present disclosure, there is provided a communication device including: a receiving unit configured to perform reception processing of a first signal; a generating unit configured to generate a second signal which responds to the first signal; and a transmitting unit configured to perform transmission processing of the second signal using a predetermined resource indicating that the second signal is a signal which responds to the first signal.

Moreover, according to the present disclosure, there is provided a communication control method to be executed by a computer, including: performing reception processing of a first signal; generating a second signal which responds to the first signal; and performing transmission processing of the second signal using a predetermined resource indicating that the second signal is a signal which responds to the first signal.

Moreover, according to the present disclosure, there is provided a program for causing a computer to realize: performing reception processing of a first signal; generating a second signal which responds to the first signal; and performing transmission processing of the second signal using a predetermined resource indicating that the second signal is a signal which responds to the first signal.

Advantageous Effects of Invention

According to the present disclosure as described above, it is possible to determine whether or not at least part of a predetermined signal is correctly received at a transmission destination device even in the case of failure in reception processing of a signal which responds to the predetermined signal.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is a flowchart illustrating the determination processing to be performed on the basis of the signal pattern of the PLCP preamble in the second example.

FIG. 8 is a diagram illustrating an example of a PLCP header according to a third example.

FIG. 9 is a diagram illustrating an example of the PLCP header according to the third example.

FIG. 11 is a diagram illustrating an example of a resource block in a fourth example.

MODE(S) FOR CARRYING OUT THE INVENTION

Figure 1:
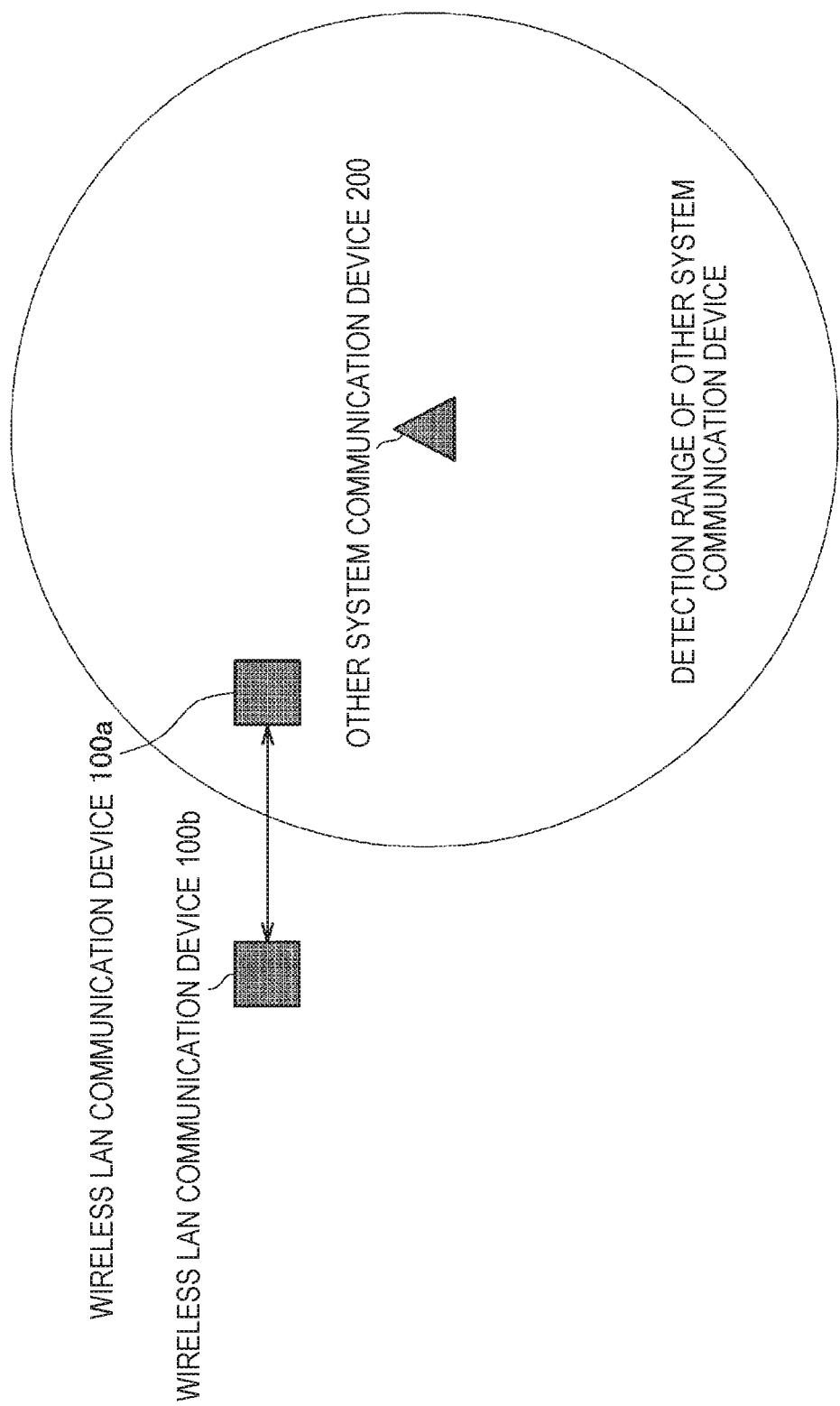
FIG. 1 is a conceptual diagram for explaining outline of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Outline of the present disclosure
2. First example
3. Second example
4. Third example
5. Fourth example
6. Fifth example
7. Utilization examples of the present disclosure
8. Application examples
9. Conclusion 1. Outline of the present disclosure An embodiment of the present disclosure relates to a wireless LAN system. Therefore, outline of the present disclosure will be described first with reference to FIG. 1. FIG. 1 is a conceptual diagram for explaining the outline of the present disclosure.

FIG. 1 illustrates a wireless LAN communication device 100a and a wireless LAN communication device 100b which belong to the wireless LAN system according to the present disclosure, and an other system communication device 200 which belongs to another system different from the wireless LAN system.

It is assumed that the wireless LAN system according to the present disclosure is a wireless LAN system which complies with standards defined by IEEE 802.11, and supports multi-input multi-output (MIMO) which is one of technologies realizing higher speed of wireless communication. MIMO is a communication scheme in which each of a transmission device and a reception device includes a plurality of antennas, and which achieves higher speed by utilizing spatial multiplex. The transmission device in a MIMO communication system transmits transmission data while distributing the transmission data into the plurality of antennas, and the reception device in the MIMO communication system performs spatial separation on signals received at the plurality of antennas through signal processing.

In the MIMO communication system, transmission capacity is increased by using a plurality of antennas without increasing a frequency band. In the MIMO communication system, because communication is performed by utilizing spatial multiplex, it is possible to improve frequency utilization efficiency. Note that, while the wireless LAN communication device 100 according to the present disclosure is one of an access point device and a station device used in the wireless LAN system, the wireless LAN communication device 100 is not limited to these.

Further, the other system is an arbitrary system and is not particularly limited. In the present specification, a case will be described as an example where the other system is a system (hereinafter, referred to as a "LAA system" for convenience) in which licensed assisted access using LTE (LAA) for which standardization is underway by 3rd generation partnership project (3GPP) which is a standards body regarding a third generation mobile phone, is used. The LAA means a technology for enabling long term evolution (LTE) to be utilized in a frequency band for which a license is not required. Communication procedure in the LAA system is different from communication procedure in the wireless LAN system which complies with IEEE 802.11. Therefore, a communication device in the LAA system can only detect a signal transmitted from the wireless LAN system which complies with IEEE 802.11 by detecting received power.

Here, because a frequency band for which a license is not required is also used in the wireless LAN system which complies with IEEE 802.11 in a similar manner to the LAA system, it can be considered that the wireless LAN system and the LAA system perform communication using the same frequency band. Therefore, there is a possibility that interference may occur by a signal of the wireless LAN system and a signal of the LAA system.

For example, FIG. 1 illustrates an example where the wireless LAN communication device 100a, the wireless LAN communication device 100b and the other system communication device 200 perform communication using the same frequency band, and the wireless LAN communication device 100a is located at a position where the wireless LAN communication device 100a can receive signals transmitted from the wireless LAN communication device 100b and the other system communication device 200. That is, there is a possibility that the signal transmitted from the wireless LAN communication device 100a or the signal to be received by the wireless LAN communication device 100a may interfere with the signal transmitted from the other system communication device 200. The present disclosure is a disclosure relating to a technology for reducing influence by such interference.

Further, in FIG. 1, the wireless LAN communication device 100b and the other system communication device 200 are in a so-called hidden node state. That is, the wireless LAN communication device 100b is in a state where the wireless LAN communication device 100b cannot detect a signal transmitted from the other system communication device 200, and the other system communication device 200 is in a state where the other system communication device 200 cannot detect a signal transmitted from the wireless LAN communication device 100b.

(1-1. Background)

Figure 2:
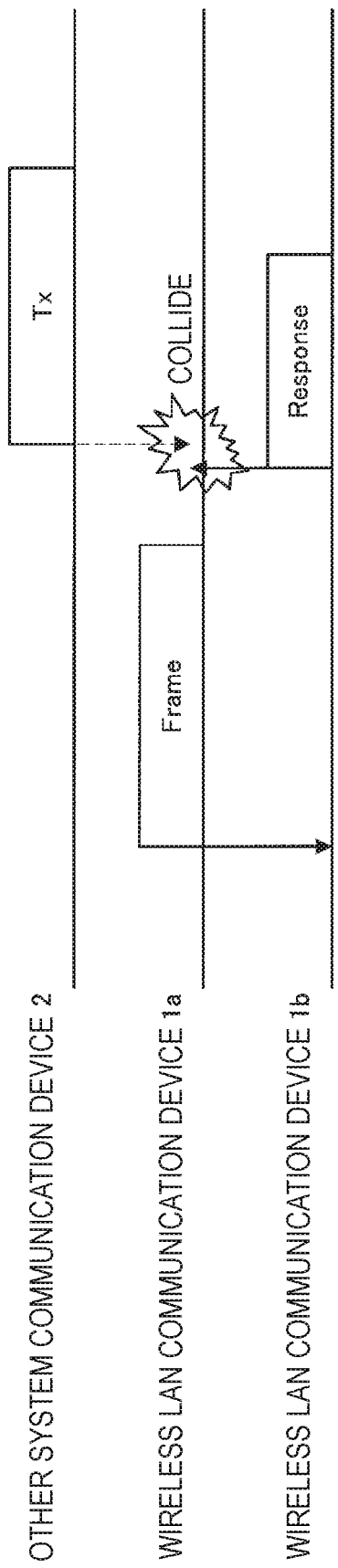
FIG. 2 is a conceptual diagram for explaining background of the present disclosure.

Subsequently, background of the present disclosure will be described with reference to FIG. 2. FIG. 2 is a conceptual diagram for explaining the background of the present disclosure. FIG. 2 illustrates a wireless LAN communication device 1a, a wireless LAN communication device 1b and an other system communication device 2 as existing communication devices to distinguish from the communication device according to the present disclosure. Note that positional relationship among the respective communication devices is similar to positional relationship illustrated in FIG. 1. That is, the wireless LAN communication device 1a is located at a position where the wireless LAN communication device 1a can receive signals transmitted from the wireless LAN communication device 1b and the other system communication device 2, and the wireless LAN communication device 1b and the other system communication device 2 are in a so-called hidden node state. Note that each block in FIG. 2 indicates a signal to be transmitted and received, an arrow indicates a transmission direction, and a horizontal axis indicates time (the same will also apply to the drawings which will be described later).

As illustrated in FIG. 2, it is assumed that the wireless LAN communication device 1a transmits a signal (for example, a data frame) for requesting a signal for response to the wireless LAN communication device 1b, and the wireless LAN communication device 1a which receives at least part of the signal transmits a signal for response (for example, an ACK frame). In this event, because the wireless LAN communication device 1b and the other system communication device 2 are in a so-called hidden node state, the other system communication device 2 cannot detect the signal for response transmitted from the wireless LAN communication device 1b. Therefore, there is a possibility that the other system communication device 2 determines that the other system communication device 2 can transmit a signal also in a period while the wireless LAN communication device 1b transmits the signal for response, and performs processing of transmitting a signal.

As a result, three is a case where interference occurs by the signal for response transmitted from the wireless LAN communication device 1b and the signal transmitted from the other system communication device 2, and the wireless LAN communication device 1a fails in reception processing (such as demodulation and decoding) of the signal for response. In this case, the wireless LAN communication device 1a cannot determine whether the signal transmitted from the wireless LAN communication device 1a is not received at the wireless LAN communication device 1b by influence of interference, or the like, or although the signal is received at the wireless LAN communication device 1b, the wireless LAN communication device 1a cannot receive the signal for response by influence of interference, or the like. In such a case, there is a case where the wireless LAN communication device 1a may erroneously determine that the signal is not received at the wireless LAN communication device 1b by influence of interference, or the like.

By this means, it can be considered that communication performance of the wireless LAN system degrades. For example, there is a case where the wireless LAN communication device 1a increases a contention window (CW) to be used for setting of a transmission waiting period of a signal to prevent occurrence of interference. Because the transmission waiting period until a signal is transmitted increases by the CW being increased, the communication performance of the wireless LAN system degrades. Further, there is a case where the wireless LAN communication device 1a lowers a transmission rate in transmission of a signal to reduce influence of interference. The communication performance of the wireless LAN system degrades also by the transmission rate being lowered. The above description is merely an example, and there can be also a case where parameters other than the CW and the transmission rate may be changed. Details will be described later.

Note that, in the case where parts of areas of a plurality of wireless LAN systems which comply with IEEE 802.11 overlap with each other, because a function is provided which controls each communication device so that, during a period while a signal is transmitted in one wireless LAN system, a signal is not transmitted in another wireless LAN system, basically, interference as described above is unlikely to occur.

Therefore, the present discloser has achieved creation of the present disclosure in view of the above-described circumstances. The wireless LAN communication device 100 according to the present disclosure can determine whether or not a signal for response is transmitted using a method described below. That is, the wireless LAN communication device 100 according to the present disclosure can determine whether or not at least part of a signal transmitted by the wireless LAN communication device 100 is received at a transmission destination device. Hereinafter, outline of functions of the present disclosure, a functional configuration of the wireless LAN communication device 100, examples of the present disclosure (first example to fifth example), utilization examples of the present disclosure, and application examples of the present disclosure will be sequentially described.

(1-2. Outline of Functions of the Present Disclosure)

The background of the present disclosure has been described above. Subsequently, outline of functions of the present disclosure will be described. The wireless LAN communication device 100 according to the present disclosure transmits a predetermined signal (hereinafter, referred to as a "first signal" for convenience), and, even in the case of failure in reception processing of a signal for response to the signal (hereinafter, referred to as a "second signal" for convenience), can determine whether or not the signal for response is transmitted on the basis of information acquired in the process of the reception processing. That is, the wireless LAN communication device 100 can determine whether or not at least part of the predetermined signal transmitted by the wireless LAN communication device 100 is received at a transmission destination device.

In the present specification, five types of determination methods from a first example to a fifth example will be described.

The first example is an example where the wireless LAN communication device 100 performs determination on the basis of whether or not received power equal to or greater than a predetermined threshold is detected after a predetermined period has elapsed since a time point of transmission of a signal.

The second example is an example where the wireless LAN communication device 100 performs determination on the basis of whether or not at least part of a signal pattern specific to a signal for response is detected.

The third example is an example where the wireless LAN communication device 100 performs determination on the basis of information included in a physical layer header of the signal for response.

The fourth example is an example where the wireless LAN communication device 100 performs determination on the basis of combination of a frequency band and a spatial stream used for reception processing of the signal for response.

The fifth example is an example where, in the case where the wireless LAN communication device 100 performs reception processing of the signal for response using a plurality of frequency bands, the wireless LAN communication device 100 performs determination on the basis of whether or not reception processing is successful in part of the frequency bands.

Note that the wireless LAN communication device 100 according to the present disclosure may perform determination using the methods in the first example to the fifth example also in the case where the reception processing is successful, as well as in the case of failure in the reception processing of the signal for response. Further, while, a case is mainly assumed where the present disclosure is used in the case where interference occurs between the wireless LAN system and another system other than the wireless LAN system, the present disclosure may be used in the case where interference occurs between wireless LAN systems.

(1-3. Functional Configuration of Wireless LAN Communication Device 100 According to the Present Disclosure)

Figure 3:
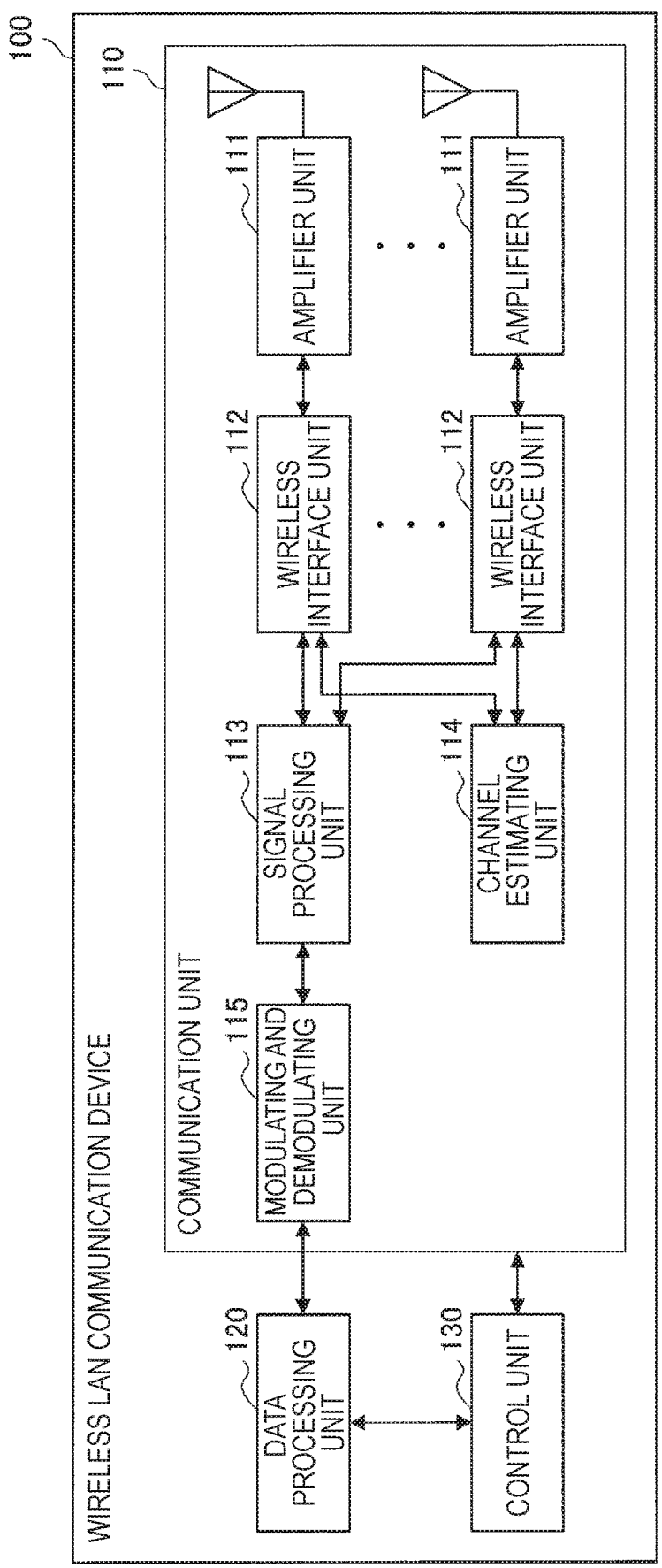
FIG. 3 is a diagram illustrating a functional configuration of a wireless LAN communication device according to the present disclosure.

The outline of the functions of the present disclosure has been described above. Subsequently, a functional configuration of the wireless LAN communication device 100 according to the present disclosure will be described with reference to FIG. 3. FIG. 3 is a diagram illustrating the functional configuration of the wireless LAN communication device 100 according to the present disclosure.

As illustrated in FIG. 3, the wireless LAN communication device 100 according to the present disclosure includes a communication unit 110, a data processing unit 120 and a control unit 130. Then, the communication unit 110 includes an amplifier unit 111, a wireless interface unit 112, a signal processing unit 113, a channel estimating unit 114 and a modulating and demodulating unit 115. Here, the communication unit 110 functions as a transmitting unit, a receiving unit and a generating unit, the data processing unit 120 functions as a generating unit, and the control unit 130 functions as a determining unit. Note that, as described above, because the wireless LAN communication device 100 according to the present disclosure supports MIMO, a plurality of amplifier units 111 and a plurality of wireless interface units 112 are provided.

(Amplifier Unit 111)

The amplifier unit 111 performs amplification processing of a signal. More specifically, upon signal reception, the amplifier unit 111 amplifies a received signal input from an antenna to predetermined power and outputs the amplified received signal to the wireless interface unit 112 which will be described later. Further, upon signal transmission, the amplifier unit 111 amplifies a transmission signal input from the wireless interface unit 112 to predetermined power and sends out the amplified transmission signal to the antenna. Note that these functions may be realized by the wireless interface unit 112.

(Wireless Interface Unit 112)

Upon signal reception, the wireless interface unit 112 acquires a baseband signal by performing down-conversion on a received signal which is an analog signal provided from the amplifier unit 111, generates a received symbol stream by performing various kinds of processing such as filtering and conversion to a digital signal on the baseband signal and outputs the received symbol stream to the signal processing unit 113 which will be described later. Further, upon signal transmission, the wireless interface unit 112 converts input from the signal processing unit 113 into an analog signal, performs filtering and up-conversion to a carrier frequency band, and sends out the up-converted signal to the amplifier unit 111.

(Signal Processing Unit 113)

Upon signal reception, the signal processing unit 113 acquires a data symbol stream independent for each received symbol stream by performing spatial processing on the received symbol stream provided from the wireless interface unit 112, and provides the data symbol stream to the modulating and demodulating unit 115 which will be described later. Further, upon signal transmission, the signal processing unit 113 performs spatial processing on the data symbol stream input from the modulating and demodulating unit 115 and provides the obtained one or more transmission symbol streams to the respective wireless interface units 112.

(Channel Estimating Unit 114)

The channel estimating unit 114 calculates complex channel gain information of a propagation channel from a preamble portion and a training signal portion among the received signals provided from the respective wireless interface units 112. The calculated complex channel gain information is utilized for demodulation processing at the modulating and demodulating unit 115 and spatial processing at the signal processing unit 113.

(Modulating and Demodulating Unit 115)

Upon signal reception, the modulating and demodulating unit 115 acquires received data by performing demodulation, de-interleaving and decoding on the data symbol stream provided from the signal processing unit 113, and provides the received data to the data processing unit 120. Further, upon signal transmission, the modulating and demodulating unit 115 generates a data symbol stream by performing encoding, interleaving and modulation on the transmission data from the data processing unit 120 which will be described later on the basis of a coding and modulation scheme set by the control unit 130 which will be described later, and provides the stream to the signal processing unit 113.

(Data Processing Unit 120)

Upon signal reception, the data processing unit 120 performs processing such as analysis of a MAC header for media access control (MAC), and error detection in a frame on the received data provided from the modulating and demodulating unit 115. Further, upon signal transmission, the data processing unit 120 generates a packet for transmission, generates transmission data by performing processing such as addition of a MAC header and addition of an error detection code on the packet, and provides the transmission data to the modulating and demodulating unit 115.

(Control Unit 130)

The control unit 130 performs control of the above-described respective components. More specifically, the control unit 130 performs processing such as setting of a parameter to be used for processing of the above-described respective components, and scheduling of the processing. Further, in the present disclosure, in the case of failure in reception processing of the signal for response, the control unit 130 implements the processing described in the first example to the fifth example by controlling the respective components, performs determination as to whether or not the signal for response is transmitted, and implements processing in accordance with a determination result. Further, in the second example to the fourth example, the control unit 130 generates and transmits the signal for response so that the other wireless LAN communication device 100 which receives the signal for response can perform the above-described determination. Details will be described later.

2. First example

The functional configuration of the wireless LAN communication device 100 according to the present disclosure has been described above. Subsequently, the first example of the present disclosure will be described.

The first example of the present disclosure is an example where it is determined whether or not a second signal is transmitted on the basis of whether or not the wireless LAN communication device 100 detects power greater than a predetermined threshold after a predetermined period has elapsed since a time point of transmission of a first signal.

It is assumed that the wireless LAN communication device 100a transmits a predetermined signal to the wireless LAN communication device 100b, the wireless LAN communication device 100b transmits a signal for response to the wireless LAN communication device 100a after the wireless LAN communication device 100b normally receives at least part of the signal, and the wireless LAN communication device 100a fails in reception processing of the signal for response. In this event, there is a case where it is known that transmission of the signal for response by the wireless LAN communication device 100b is performed after a first period since transmission of the predetermined signal by the wireless LAN communication device 100a has been completed. The wireless LAN communication device 100a according to the present example determines that the wireless LAN communication device 100b normally receives at least part of the predetermined signal and transmits the signal for response on the basis that received power equal to or greater than a predetermined threshold can be detected after the first period has elapsed and before a second period has elapsed since the time point at which transmission of the predetermined signal was completed.

Here, the first period is, for example, short inter frame space (SIFS), and the second period is, for example, an upper limit of a reception waiting period for the signal for response. Further, the predetermined threshold is, for example, a threshold for detecting a preamble of the signal for response. Note that the first period, the second period and the predetermined threshold may be set while propagation delay and an individual difference of the wireless LAN communication devices 100 are taken into account or may be changed as appropriate.

By this means, the wireless LAN communication device 100a can determine whether or not the signal for response is transmitted even if the wireless LAN communication device 100a fails in reception processing of the signal for response. That is, the wireless LAN communication device 100a can determine whether or not at least part of the predetermined signal transmitted by the wireless communication device 100a is normally received at the wireless LAN communication device 100b without confirming a reception state of the signal to the wireless LAN communication device 100b.

Figure 4:
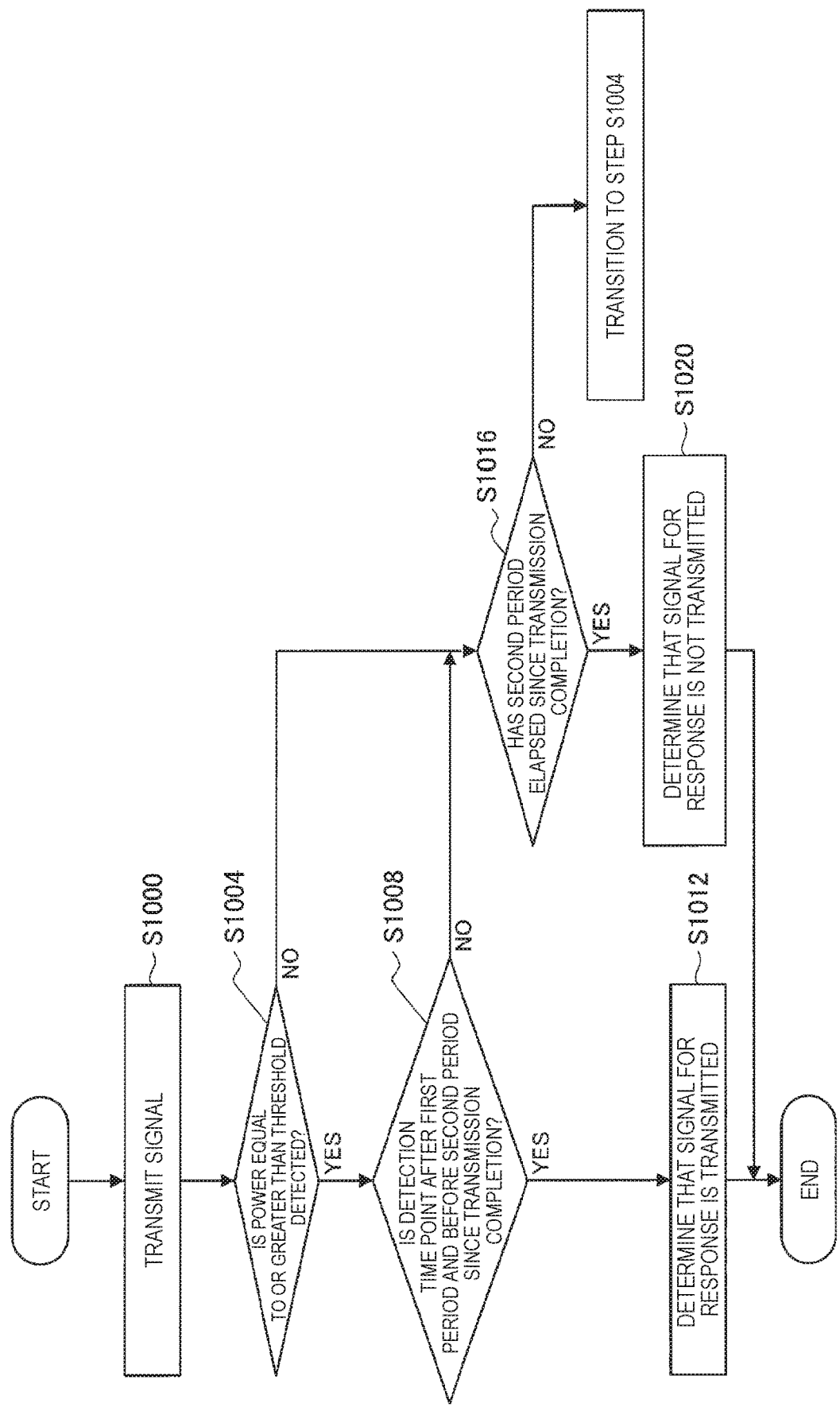
FIG. 4 is a flowchart illustrating determination processing to be performed on the basis of detection of received power in a first example.

Subsequently, operation in the first example will be described in detail with reference to FIG. 4. FIG. 4 is a flowchart illustrating determination processing to be performed on the basis of detection of received power in the first example.

First, in step S1000, the wireless LAN communication device 100a transmits a predetermined signal to the wireless LAN communication device 100b. Then, the wireless LAN communication device 100b receives at least part of the signal and transmits a signal for response to the wireless LAN communication device 100a. Thereafter, in step S1004, the wireless LAN communication device 100a detects received power equal to or greater than the predetermined threshold (step S1004: Yes), and, in the case where a detection time point is after the first period has elapsed and before the second period has elapsed since a time point at which transmission of the predetermined signal was completed (step S1008: Yes), in step S1012, the wireless LAN communication device 100a determines that the signal for response is transmitted. That is, the wireless LAN communication device 100a determines that at least part of the predetermined signal transmitted by the wireless LAN communication device 100*a* is normally received by the wireless LAN communication device 100*b*.

In the case where the second period has elapsed since a time point at which transmission of the predetermined period was completed (step S1016: Yes) without received power equal to or greater than the threshold being detected in step S1004 (step S1004: No), in step S1020, the wireless LAN communication device 100*a* determines that the signal for response is not transmitted. In step S1016, in the case where the second period has not elapsed (step S1016: No), the processing transitions to step S1004.

Further, in the first example, in addition to the above-described determination processing, determination processing based on detection of a known signal pattern included in the signal for response may be performed. Here, while description will be provided assuming that the known signal pattern is, for example, a signal pattern set in a short training field (L-STF) or a long training field (L-LTF) in a physical layer convergence procedure (PLCP) preamble, the signal pattern is not limited to these. Because the wireless LAN communication device 100 can determine that the received signal is not a signal transmitted from other systems, but a signal transmitted from the wireless LAN system by detecting these known signal patterns, it is possible to further improve detection accuracy of the signal for response.

Figure 5:
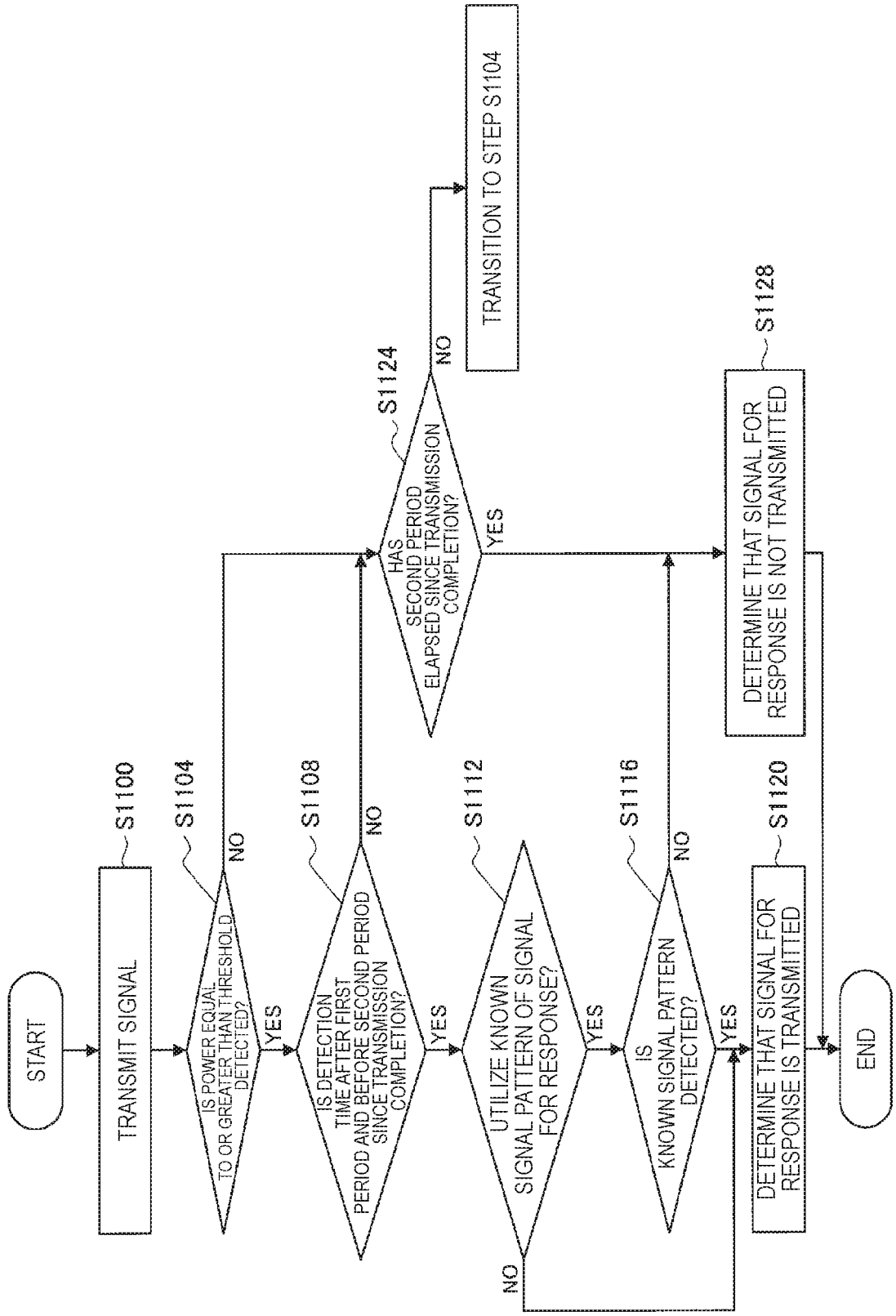
FIG. 5 is a flowchart illustrating determination processing to be performed on the basis of detection of received power and detection of a known signal pattern in the first example.

Here, operation in the case where the determination processing based on detection of the known signal pattern included in the signal for response is performed will be described in detail with reference to FIG. 5. FIG. 5 is a flowchart illustrating the determination processing to be performed on the basis of detection of received power and detection of the known signal pattern in the first example.

Operation from step S1100 to step S1108 and operation in step S1124 are the same as those in the example in FIG. 4, description will be omitted. In the case where the wireless LAN communication device 100*a* utilizes the known signal pattern included in the signal for response for determination processing (step S1112: Yes), and in the case where all or part of the known signal pattern can be detected (step S1116: Yes), in step S1120, the wireless LAN communication device 100*a* determines that the signal for response is transmitted. That is, the wireless LAN communication device 100*a* determines that the predetermined signal transmitted by the wireless LAN communication device 100*a* is normally received by the wireless LAN communication device 100*b*.

In the case where the wireless LAN communication device 100*a* does not utilize the known signal pattern included in the signal for response for determination processing in step S1112 (step S1112: No), in a similar manner to FIG. 4, in step S1120, the wireless LAN communication device 100*a* determines that the signal for response is transmitted. Further, in the case where all or part of the known signal pattern cannot be detected in step S1116 (step S1116: No), in step S1128, the wireless LAN communication device 100*a* determines that the signal for response is not transmitted.

3. Second example

The first example of the present disclosure has been described above. Subsequently, the second example of the present disclosure will be described.

The second example of the present disclosure is an example where the wireless LAN communication device 100 performs determination on the basis of whether or not at least part of a signal pattern specific to the signal for response is detected. Here, while description will be provided using an example where the signal pattern specific to the signal for response is a signal pattern of a PLCP preamble, the signal pattern is not limited to this.

More specifically, in the second example, the wireless LAN communication device 100 generates a signal for response using the PLCP preamble different from a PLCP preamble of a signal which is not a signal for response. By this means, the wireless LAN communication device 100 which receives the signal for response can determine whether or not the received signal is the signal for response on the basis of the PLCP preamble.

Figure 6A:
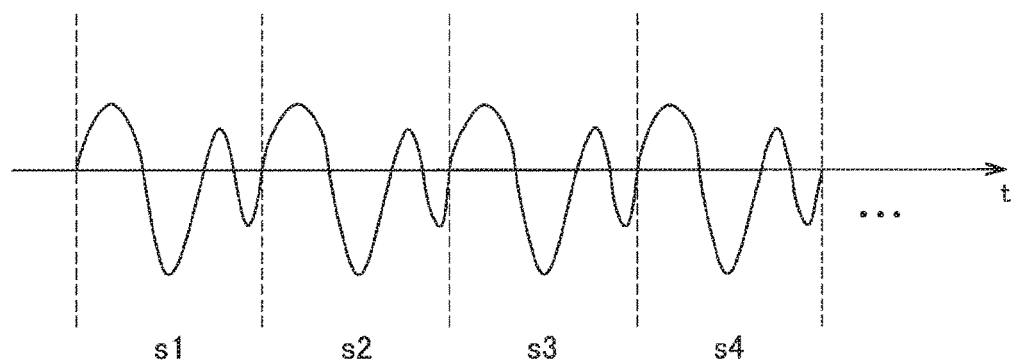
FIGS. 6A and 6B are diagrams for explaining determination processing to be performed on the basis of a signal pattern of a PLCP preamble in a second example.
Figure 6B:
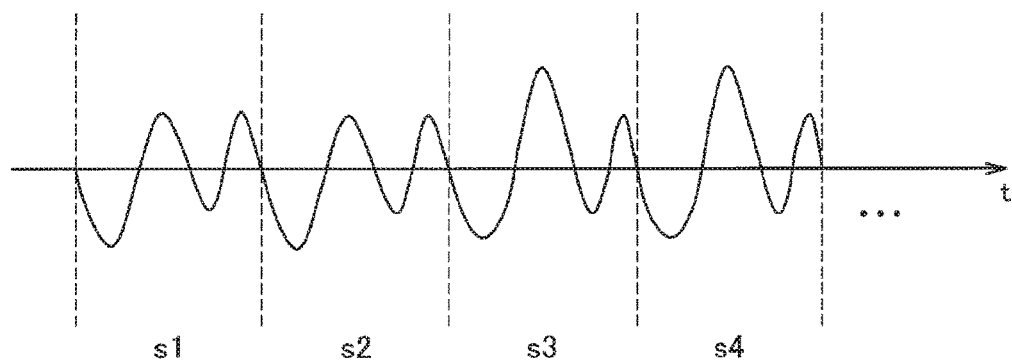

Here, the PLCP preamble to be used in the present example will be described with reference to FIGS. 6A and 6B. FIGS. 6A and 6B are diagrams for explaining determination processing to be performed on the basis of the signal pattern of the PLCP preamble in the second example. FIG. 6A illustrates an example of a signal pattern of an L-STF of a signal which is not the signal for response, and FIG. 6B illustrates an example of a signal pattern of an L-STF of the signal for response. As illustrated in FIGS. 6A and 6B, the signal pattern in FIG. 6A and the signal pattern in FIG. 6B are different from each other in respective periods separated at predetermined intervals (described as s1, s2, s3 and s4 in the drawing). The wireless LAN communication device 100 can determine whether the received signal is the signal for response or a signal which is not the signal for response by calculating correlation of the received signal with the signal pattern of the signal for response and the signal pattern of a signal which is not the signal for response. Note that FIGS. 6A and 6B is merely an example, and the present disclosure can be also applied to an L-LTF as well as the L-STF.

Here, operation in the case where determination processing is performed on the basis of the signal pattern of the PLCP preamble will be described in detail with reference to FIG. 7. FIG. 7 is a flowchart illustrating the determination processing to be performed on the basis of the signal pattern of the PLCP preamble in the second example.

First, in step S1200, the wireless LAN communication device 100*a* transmits a predetermined signal to the wireless LAN communication device 100*b*. Thereafter, the wireless LAN communication device 100*b* receives at least part of the signal and transmits a signal for response to the wireless LAN communication device 100*a*. Then, in the case where the wireless LAN communication device 100*a* detects all or part of the PLCP preamble of the signal for response (step S1204: Yes), in step S1208, the wireless LAN communication device 100*a* determines that the signal for response is transmitted. That is, the wireless LAN communication device 100*a* determines that at least part of the predetermined signal transmitted by the wireless LAN communication device 100*a* is normally received by the wireless LAN communication device 100*b*.

In the case where the second period has elapsed since a time point at which transmission of the predetermined signal was completed (step S1212: Yes) without the wireless LAN communication device 100*a* being able to detect all or part of the PLCP preamble of the signal for response in step S1204 (step S1204: No), in step S1216, the wireless LAN communication device 100*a* determines that the signal for response is not transmitted. In step S1212, in the case where the second period has not elapsed (step S1212: No), the processing transitions to step S1204.

Note that the PLCP preamble of the signal for response in the present example may be one obtained by changing part of a shape of the PLCP preamble of a signal which is not the signal for response. For example, the PLCP preamble of the signal for response may be a signal pattern generated by shifting a phase of the PLCP preamble of the signal which is not the signal for response by a certain amount or may be a signal pattern generated by replacing part of the PLCP preamble of the signal which is not the signal for response with a predetermined signal pattern. Further, all types of signals for response do not have to have the same PLCP preamble. For example, different PLCP preambles may be used for each type (such as ACK and CTS) of the signal for response.

4. Third example

The second example of the present disclosure has been described above. Subsequently, the third example of the present disclosure will be described.

The third example of the present disclosure is an example where the wireless LAN communication device 100 performs determination on the basis of information included in a physical layer header of the signal for response. Here, while a PLCP header will be described as an example of the physical layer header of the signal for response, the physical layer header is not limited to this.

More specifically, in the third example, the wireless LAN communication device 100 according to the present example sets a predetermined value at the PLCP header of the signal for response. By this means, the wireless LAN communication device 100 which receives the signal for response can determine whether or not the received signal is the signal for response by succeeding in reception processing of all or part of the PLCP header and confirming the presence of the predetermined value.

Here, the PLCP header in the present example will be described with reference to FIG. 8 and FIG. 9. FIG. 8 and FIG. 9 are diagrams illustrating an example of the PLCP header according to the third example. As illustrated in FIG. 8, the PLCP header has a Rate field, a Reserved field, a Length field, a Parity bit, a Tail bit and a Service field.

It is assumed that, while, normally, "0" is set in the Reserved field of the PLCP header of the signal which is not the signal for response, in the present example, "1" is set in the Reserved field of the signal for response. Then, the wireless LAN communication device 100 which receives the signal determines whether or not the received signal is the signal for response on the basis of whether "0" is set or "1" is set in the Reserved field. Note that FIG. 8 is merely an example, and a predetermined value indicating that the signal is the signal for response may be set in a field other than the Reserved field.

Further, a configuration itself of the PLCP header may be changed. More specifically, as illustrated in FIG. 9, a Response field may be newly added to the PLCP header (in the drawing, a field corresponding to two bits is added), and a predetermined value indicating that the signal is the signal for response and indicating other information (such as a type of the signal) may be set in the field. Note that part of the existing field may be utilized instead of a new field being added. For example, the wireless LAN communication device 100 may reduce part of the Length field, and may set a predetermined value corresponding to a reduced data amount.

According to the present example, even in the case of failure in part of reception processing of the signal, if the wireless LAN communication device 100 succeeds in reception processing of a PLCP header portion, the wireless LAN communication device 100 can determine whether or not the received signal is the signal for response.

Figure 10:
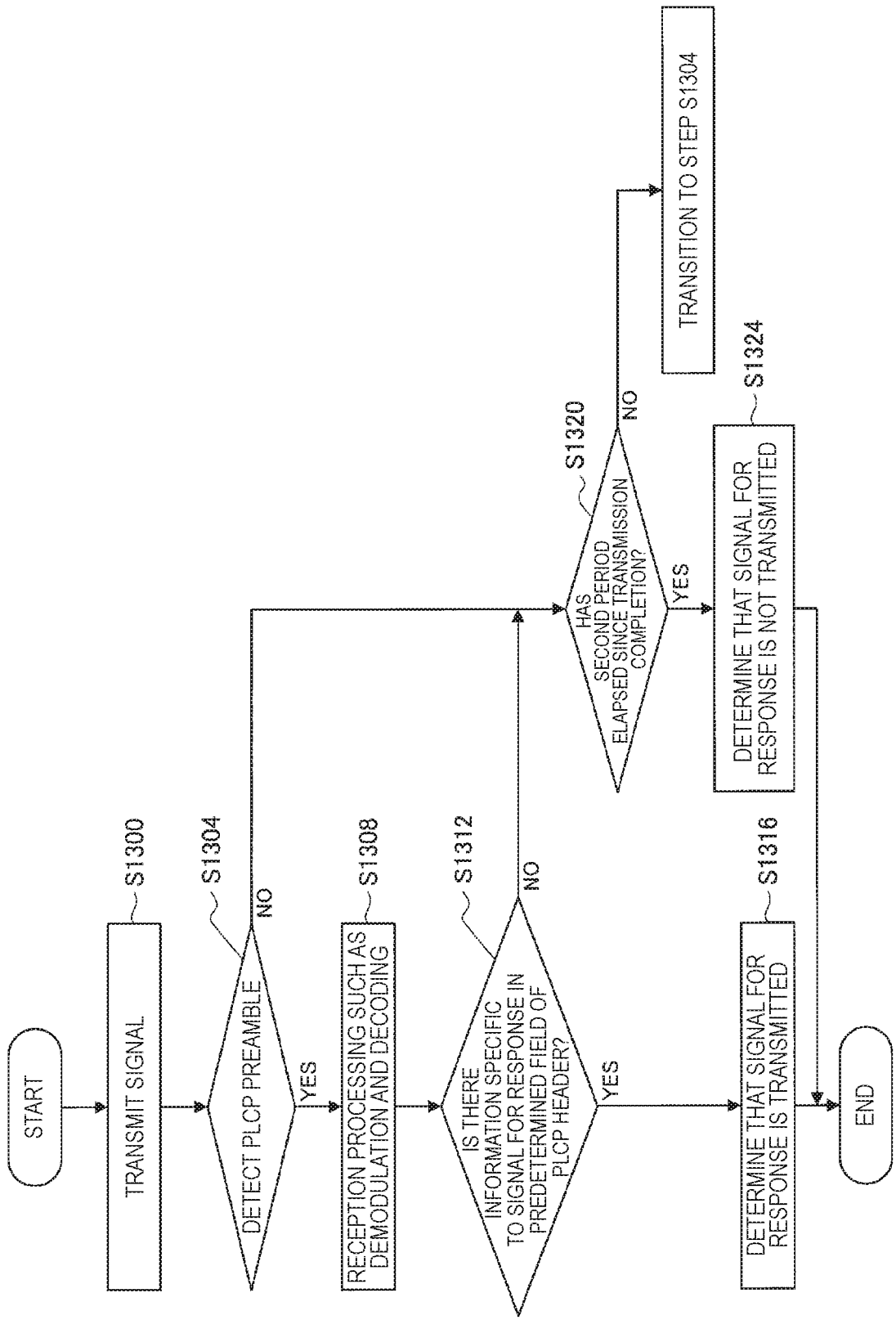
FIG. 10 is a flowchart illustrating determination processing to be performed on the basis of information set in the PLCP header in the third example.

Here, operation in the case where determination processing is performed on the basis of information set in the PLCP header will be described in detail with reference to FIG. 10. FIG. 10 is a flowchart illustrating the determination processing to be performed on the basis of the information set in the PLCP header in the third example.

First, in step S1300, the wireless LAN communication device 100*a* transmits a predetermined signal to the wireless LAN communication device 100*b*. Then, the wireless LAN communication device 100*b* receives at least part of the signal and transmits a signal for response to the wireless LAN communication device 100*a*. Thereafter, in step S1304, the wireless LAN communication device 100*a* detects a PLCP preamble of the signal for response, and, in step S1308, performs reception processing such as demodulation and decoding on the signal for response. In the case where the wireless LAN communication device 100*a* can confirm that information specific to the signal for response is set in a predetermined field of the PLCP header in step S1312 (step S1312: Yes), in step S1316, the wireless LAN communication device 100*a* determines that the signal for response is transmitted. That is, the wireless LAN communication device 100*a* determines that at least part of the predetermined signal transmitted by the wireless LAN communication device 100*a* is normally received by the wireless LAN communication device 100*b*.

In the case where the wireless LAN communication device 10*a* cannot confirm that information specific to the signal for response is set in a predetermined field of the PLCP header in step S1312 (S1312: No), and the second period has elapsed since a time point at which transmission of the predetermined signal was completed (step S1320: Yes), in step S1324, the wireless LAN communication device 100*a* determines that the signal for response is not transmitted. In the case where the second period has not elapsed in step S1320 (step S1320: No), the processing transitions to step S1304.

5. Fourth example

The third example of the present disclosure has been described above. Subsequently, the fourth example of the present disclosure will be described.

The fourth example of the present disclosure is an example where the wireless LAN communication device 100 performs determination on the basis of combination of a frequency band and a spatial stream used for reception processing of the signal for response.

More specifically, in the fourth example, the wireless LAN communication device 100 supporting MIMO can transmit a signal while designating a plurality of frequency bands and a plurality of spatial streams. Here, resources expressed with a plurality of frequency bands and a plurality of spatial streams will be referred to as a "resource block". The wireless LAN communication device 100 according to the present example distinguishes between a resource block to be used for transmission of the signal for response and a resource block to be used for transmission of a signal which is not the signal for response. By this means, the wireless LAN communication device 100 which receives the signal determines whether or not the received signal is the signal for response on the basis of which resource block is used. More specifically, the wireless LAN communication device 100 determines whether or not the received signal is the signal for response on the basis of in which resource block the preamble is detected.

According to the present example, even in the case of failure in part of reception processing of the signal, if the wireless LAN communication device 100 succeeds in detection of a preamble, the wireless LAN communication device 100 can determine whether or not the received signal is the signal for response on the basis of in which resource block the preamble is detected. Note that, even in the case where the wireless LAN communication device 100 cannot detect a preamble, the wireless LAN communication device 100 may determine whether or not the received signal is the signal for response on the basis of in which resource block received power of a predetermined threshold is detected.

An example of the resource block will be described next with reference to FIG. 11. FIG. 11 is a diagram illustrating an example of the resource block in the fourth example. FIG. 11 illustrates an example in the case where a plurality of resource units (described as "RU: Resource Unit" in the drawing) is used on a frequency axis, and a plurality of spatial streams (described as "SS: Spatial Stream" in the drawing) is used.

It is assumed here that resource blocks (colored resource blocks in FIG. 11) to which spatial streams which are different for each resource unit (frequency band) are applied are used for communication of the signal for response. By this means, even in the case where the wireless LAN communication device 100 cannot perform reception using a predetermined resource unit or a predetermined spatial stream for some reasons such as interference with other systems, it is possible to increase a possibility that the wireless LAN communication device 100 can receive the signal for response using any other resource unit or a predetermined spatial stream.

Figure 12:
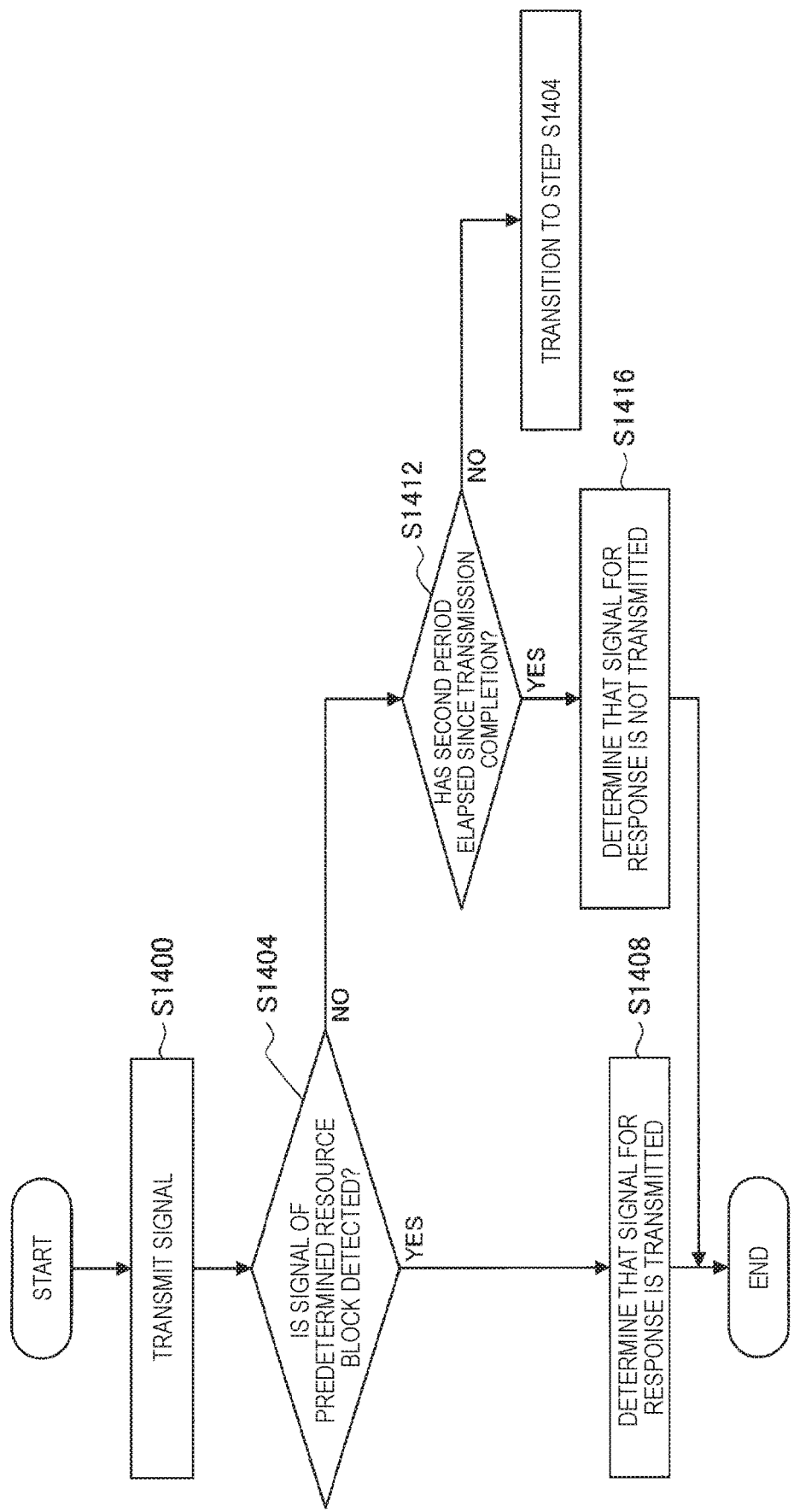
FIG. 12 is a flowchart illustrating determination processing to be performed on the basis of a resource block to be used for communication in the fourth example.

Operation in the case where determination processing is performed on the basis of the resource block to be used for communication will be described in detail next with reference to FIG. 12. FIG. 12 is a flowchart illustrating determination processing to be performed on the basis of the resource block to be used for communication in the fourth example.

First, in step S1400, the wireless LAN communication device 100a transmits a predetermined signal to the wireless LAN communication device 100b. Thereafter, the wireless LAN communication device 100b receives at least part of the signal and transmits a signal for response to the wireless LAN communication device 100a. Thereafter, in the case where the wireless LAN communication device 100a detects a preamble in a predetermined resource block to be used for communication of the signal for response in step S1404 (step S1404: Yes), in step S1408, the wireless LAN communication device 100a determines that the signal for response is transmitted. That is, the wireless LAN communication device 100a determines that at least part of the predetermined signal transmitted by the wireless LAN communication device 100a is normally received by the wireless LAN communication device 100b.

In the case where the second period has elapsed since a time point at which transmission of the predetermined signal was completed (step S1412: Yes) while the wireless LAN communication device 100a cannot detect a preamble in a predetermined resource block to be used for communication of the signal for response in step S1404 (step S1404: No), in step S1416, the wireless LAN communication device 100a determines that the signal for response is not transmitted. In step S1412, in the case where the second period has not elapsed (step S1412: No), the processing transitions to step S1404.

6. Fifth example

The fourth example of the present disclosure has been described above. Subsequently, the fifth example of the present disclosure will be described.

The fifth example of the present disclosure is an example where, in the case where the wireless LAN communication device 100 performs reception processing of the signal for response using a plurality of frequency bands, the wireless LAN communication device 100 performs determination on the basis of whether or not reception processing is successful in part of the frequency bands.

Figure 13:
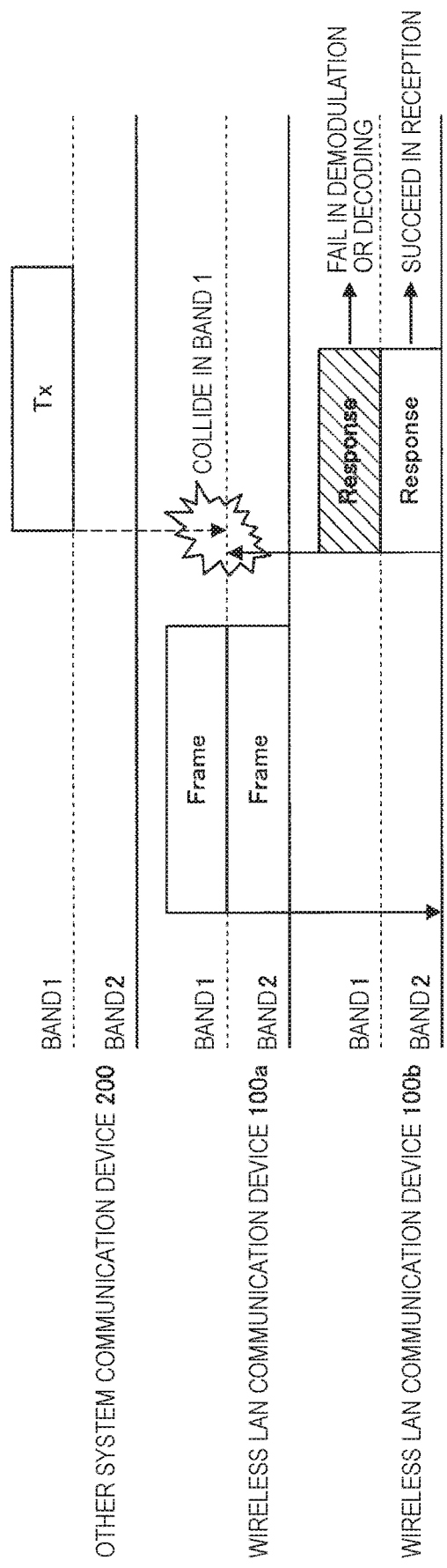
FIG. 13 is a diagram for explaining a communication scheme according to a fifth example.

Here, the present example will be specifically described with reference to FIG. 13. FIG. 13 is a diagram for explaining a communication scheme according to the fifth example.

As illustrated in FIG. 13, the wireless LAN communication device 100a which is a transmission side transmits a predetermined signal using a plurality of frequency bands of a band 1 and a band 2, and the wireless LAN communication device 100b which is a reception side performs reception processing of the signal in the plurality of frequency bands. The wireless LAN communication device 100b then transmits a signal for response using the plurality of frequency bands of the band 1 and the band 2 in a similar manner as described above. It is assumed here that the other system communication device 200 uses the band 1 for transmission processing, and the wireless LAN communication device 100a fails in reception processing of the signal for response in the band 1 by a signal transmitted by the other system communication device 200 and the signal for response transmitted by the wireless LAN communication device 100b interfering with each other.

In the case where the present example is not applied, normally, in the case of failure in reception processing of a signal in part of frequency bands, even in the case where reception processing of the signal in other frequency bands is successful, the reception is not regarded as successful. Meanwhile, in the case where reception processing of the signal in part of frequency bands is successful, the wireless LAN communication device 100a according to the present example regards the reception as successful even in the case of failure in reception processing of the signal in other frequency bands. That is, even in the case of failure in reception processing of the signal for response in the band 1, if the wireless LAN communication device 100a succeeds in reception processing in other band 2, the wireless LAN communication device 100a regards the reception as successful on the basis of the success, and can determine that the wireless LAN communication device 100b on the reception side normally receives at least part of the predetermined signal and transmits the signal for response.

Figure 14:
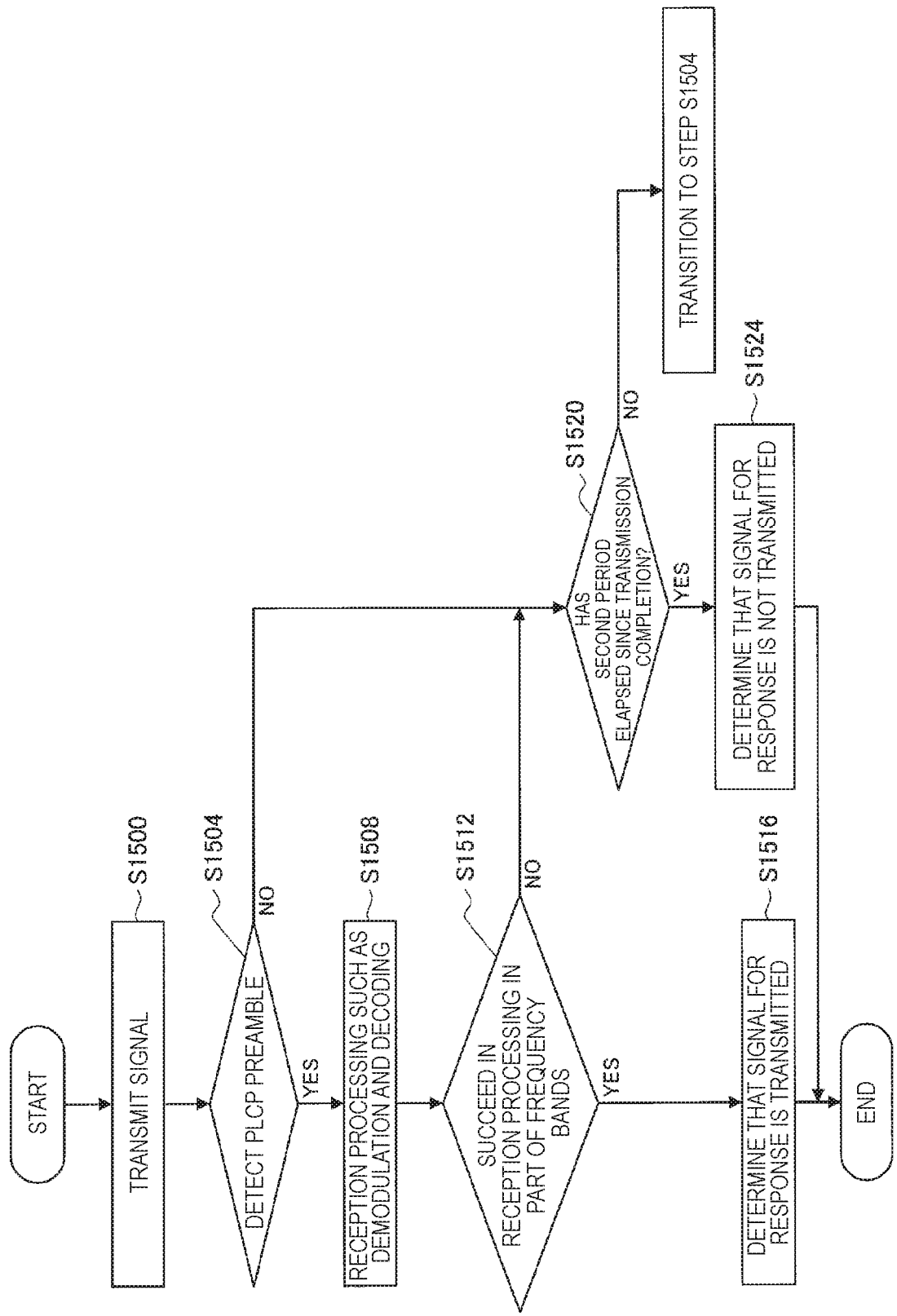
FIG. 14 is a flowchart illustrating determination processing to be performed on the basis of a reception result in part of frequency bands.

Subsequently, operation according to the fifth example will be described in detail with reference to FIG. 14. FIG. 14 is a flowchart illustrating determination processing to be performed on the basis of a reception result in part of the frequency bands in the fifth example.

First, in step S1500, the wireless LAN communication device 100a transmits a predetermined signal to the wireless LAN communication device 100b. Then, the wireless LAN communication device 100b receives at least part of the signal and transmits a signal for response to the wireless LAN communication device 100a. Thereafter, in step S1504, the wireless LAN communication device 100a detects a PLCP preamble of the signal for response, and, in step S1508, performs reception processing such as demodulation and decoding on the signal for response. In the case where the wireless LAN communication device 100a succeeds in reception processing in part of the frequency bands in step S1512 (step S1512: Yes), in step S1516, the wireless LAN communication device 100a determines that the signal for response is transmitted even in the case of failure in reception processing in other frequency bands. That is, the wireless LAN communication device 100a determines that at least part of the predetermined signal transmitted by the wireless LAN communication device 100a is normally received by the wireless LAN communication device 100b.

In the case where the wireless LAN communication device 100a fails in reception processing in all the frequency bands in which reception processing is performed in step S1512 (step S1512: No), and the second period has elapsed since a time point at which transmission of the predetermined signal was completed (step S1520: Yes), in step S1524, the wireless LAN communication device 100a determines that the signal for response is not transmitted. In the case where the second period has not elapsed in step S1520 (step S1520: No), the processing transitions to step S1504.

7. Utilization examples of the present disclosure

The fifth example of the present disclosure has been described above. Subsequently, utilization examples of the present disclosure will be described. As described above, according to the first example to the fifth example, even in the case of failure in reception processing of the signal for response, the wireless LAN communication device 100 can determine whether or not the received signal is the signal for response on the basis of information acquired in the process of the reception processing. Hereinafter, utilization examples of the determination methods according to the first example to the fifth example in various communication schemes will be described.

(7-1. Case where the Determination Methods are Utilized for Detection of Block ACK Frame)

Figure 15:
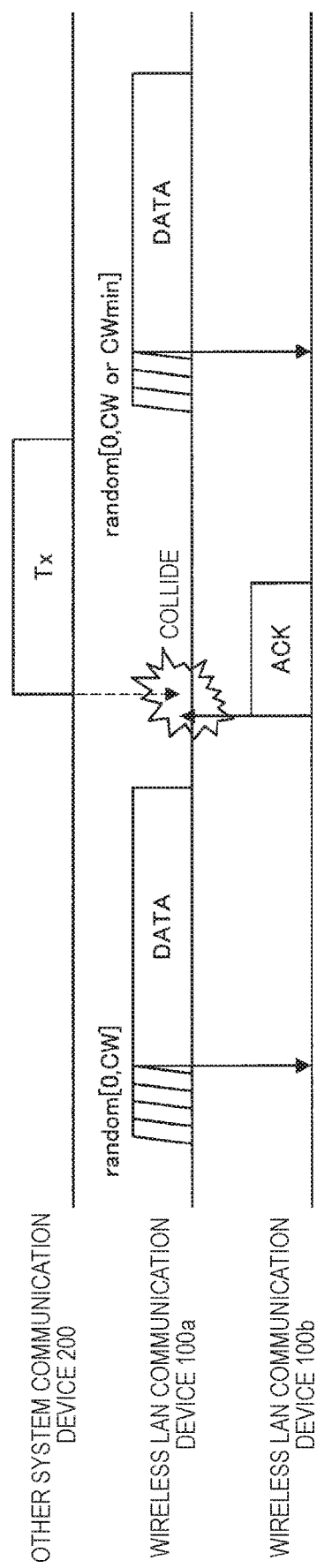
FIG. 15 is a diagram illustrating a case where the present disclosure is utilized for detection of a Block ACK frame.

A case where the above-described determination methods are utilized for detection of a Block ACK frame which is a signal for response of a data frame will be described first with reference to FIG. 15. FIG. 15 is a diagram illustrating a case where the present disclosure is utilized for detection of the Block ACK frame. Note that the present disclosure may be utilized for detection of an ACK frame or a Multi STA Block ACK frame addressed to a plurality of communication devices instead of the Block ACK frame.

As illustrated in FIG. 15, first, the wireless LAN communication device 100a sets a transmission waiting period on the basis of a random number generated in a range from 0 to the CW to prevent occurrence of interference with signals transmitted from other communication devices, and transmits a data frame to the wireless LAN communication device 100b after the transmission waiting period has elapsed. This data frame may include a plurality of data units. Then, in the case where the data frame is received, and at least one of the plurality of data units is normally received, the wireless LAN communication device 100b transmits a Block ACK frame to the wireless LAN communication device 100a as the signal for response. It is assumed that the wireless LAN communication device 100a fails in reception processing of the Block ACK frame as a result of a signal transmitted from other system communication device 200 and the Block ACK frame interfering with each other.

In this event, the wireless LAN communication device 100a determines that the Block ACK frame is transmitted using a method of one of the above-described first example to the fifth example or a method of combination of the first example to the fifth example. That is, the wireless LAN communication device 100a determines that at least part of the data frame is normally received by the wireless LAN communication device 100b.

By this means, the wireless LAN communication device 100a can appropriately perform subsequent communication. More specifically, the wireless LAN communication device 100a does not increase the CW to be used for setting of a waiting period for subsequent data transmission or keeping the CW at a minimum value (hereinafter, referred to as "CWmin" for convenience) by determining that at least part of the data frame is normally received by the wireless LAN communication device 100b. By this means, the wireless LAN communication device 100a can reduce a possibility that a waiting period for subsequent data transmission increases.

Figure 16:
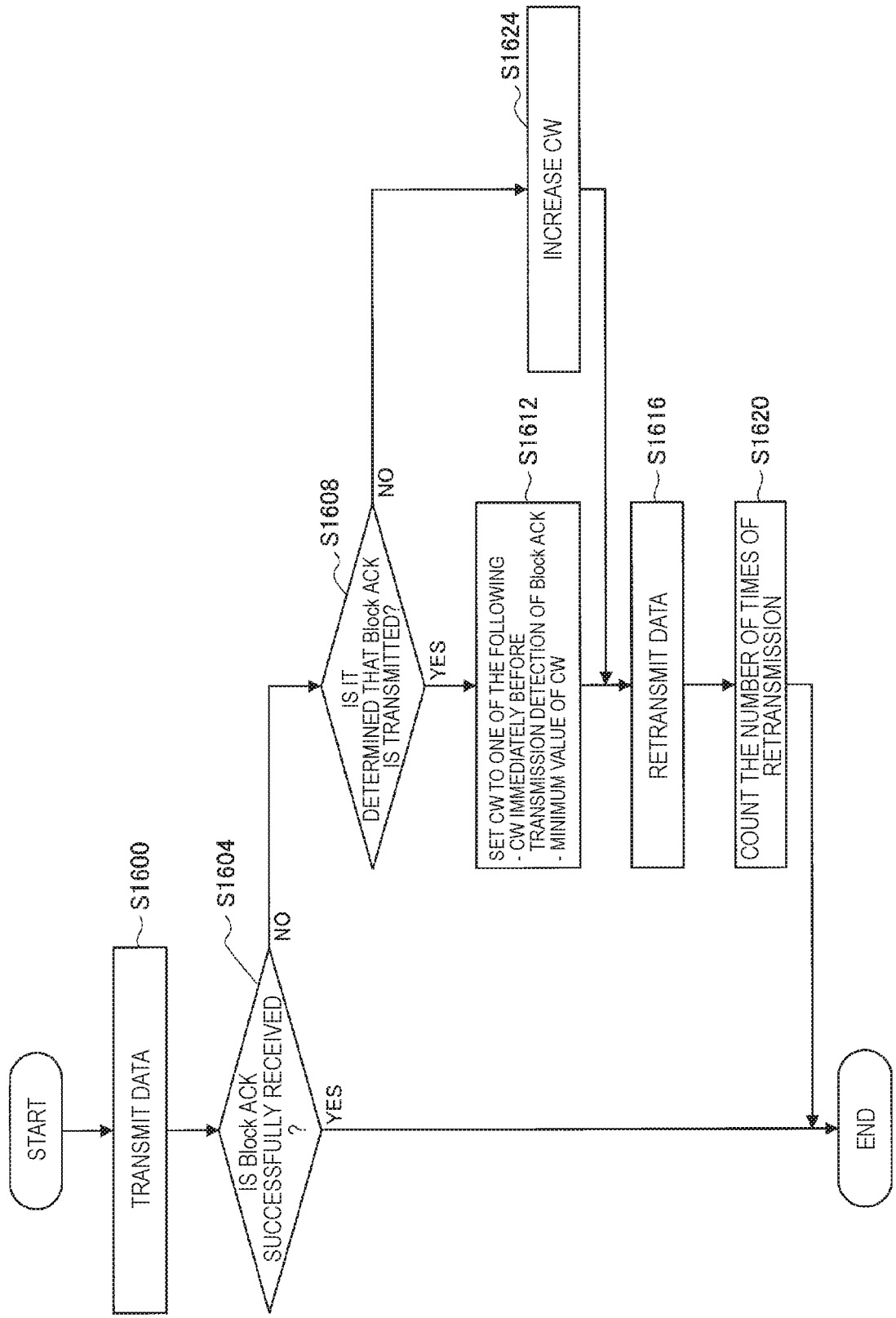
FIG. 16 is a flowchart illustrating operation in the case where the present disclosure is utilized for detection of a Block ACK frame.

Here, operation in the case where the present disclosure is utilized for detection of the Block ACK frame will be described with reference to FIG. 16. FIG. 16 is a flowchart illustrating the operation in the case where the present disclosure is utilized for detection of the Block ACK frame.

First, in step S1600, the wireless LAN communication device 100a transmits a data frame to the wireless LAN communication device 100b. Thereafter, the wireless LAN communication device 100b receives at least part of the data frame and transmits a Block ACK frame to the wireless LAN communication device 100a. In the case where the wireless LAN communication device 100a fails in reception of the Block ACK frame by influence of interference, or the like, in step S1604 (step S1604: No), in step S1608, the wireless LAN communication device 100a determines whether or not the Block ACK frame is transmitted using a method of one of the above-described first example to fifth example or a method of combination of the first example to the fifth example.

In the case where it is determined that the Block ACK frame is transmitted (step S1608: Yes), in step S1612, the wireless LAN communication device 100a sets a CW immediately before the Block ACK frame is transmitted or CWmin at the CW. Then, the wireless LAN communication device 100a retransmits the data frame after the transmission waiting period set on the basis of the CW has elapsed in step S1616, and processing is finished after the number of times of retransmission is counted in step S1620. In the case where it is determined in step S1608 that the Block ACK frame is not transmitted (step S1608: No), in step S1624, the wireless LAN communication device 100a increases the CW and performs retransmission of the data frame in step S1616 and subsequent steps. Note that, in the case where the wireless LAN communication device 100a succeeds in reception of the Block ACK frame without being influenced by interference, or the like, in step S1604 (step S1604: Yes), of course, the wireless LAN communication device 100a does not retransmit the data frame, and the processing is finished.

Note that the above is merely an example, and the wireless LAN communication device 100a may control parameters other than the CW. For example, in the case where it is determined that the Block ACK frame is transmitted while the wireless LAN communication device 100a controls a transmission rate, the wireless LAN communication device 100a may maintain the transmission rate instead of lowering the transmission rate. That is, the wireless LAN communication device 100a can prevent the transmission rate from being inappropriately lowered by erroneous determination that the data frame is not normally received due to interference, or the like, so that it is possible to prevent reduction of communication speed.

Further, in the case where it is determined that the Block ACK frame is transmitted while the wireless LAN communication device 100a controls transmission power, the wireless LAN communication device 100a may maintain the transmission power instead of increasing the transmission power. That is, the wireless LAN communication device 100a can prevent the transmission power from being inappropriately increased by erroneous determination that the data frame is not normally received due to interference, or the like, so that it is possible to prevent degradation of communication performance of the whole system due to increase of interference.

Further, in the case where it is determined that the Block ACK frame is transmitted while the wireless LAN communication device 100a controls a threshold to be used for power detection, the wireless LAN communication device 100a may maintain the threshold to be used for power detection instead of lowering the threshold. That is, the wireless LAN communication device 100a can prevent the threshold to be used for power detection from being inappropriately lowered by erroneous determination that the data frame is not normally received due to interference, or the like, so that it is possible to prevent detection of an unnecessary signal such as noise.

(7-2. Case where the Determination Methods are Utilized for Detection of a CTS Frame)

Figure 17:
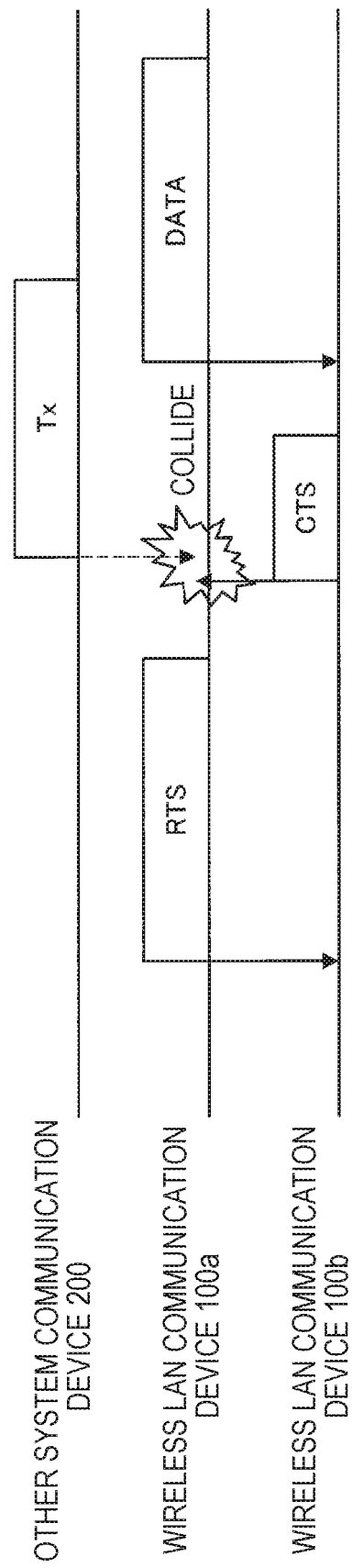
FIG. 17 is a diagram illustrating a case where the present disclosure is utilized for detection of a CTS frame.

Subsequently, a case where the above-described determination methods are utilized for detection of a clear to send (CTS) frame which is a signal for response to a request to send (RTS) frame will be described with reference to FIG. 17. FIG. 17 is a diagram illustrating a case where the present disclosure is utilized for detection of the CTS frame. Note that a multi user RTS (MU RTS) frame addressed to a plurality of wireless LAN communication devices 100 may be used instead of the RTS frame.

As illustrated in FIG. 17, first, the wireless LAN communication device 100a transmits an RTS frame to the wireless LAN communication device 100b to confirm whether or not the wireless LAN communication device 100b which is a destination device is in a state where the wireless LAN communication device 100b can perform reception before transmitting a data frame. The wireless LAN communication device 100b which receives the RTS frame then transmits a CTS frame to the wireless LAN communication device 100a to make a notification that the wireless LAN communication device 100b is in a state where the wireless LAN communication device 100b can receive a data frame. It is assumed that the wireless LAN communication device 100a fails in reception processing of the CTS frame by a signal transmitted from the other system communication device 200 and the CTS frame interfering with each other.

In this event, the wireless LAN communication device 100a determines that the CTS frame is transmitted using a method of one of the above-described first example to the fifth example or a method of combination of the first example to the fifth example. That is, the wireless LAN communication device 100a determines that RTS frame is normally received by the wireless LAN communication device 100b.

By this means, the wireless LAN communication device 100a can appropriately perform the subsequent communication. For example, the wireless LAN communication device 100a transmits a data frame even while received power exceeding the predetermined threshold (that is, a signal transmitted from the other system communication device 200) is detected by determining that the RTS frame is received by the wireless LAN communication device 100b and the CTS frame is transmitted. More specifically, the wireless LAN communication device 100a may transmit a data frame even while received power exceeding the predetermined threshold is detected by judging that the other system communication device 200 and the wireless LAN communication device 100b are in a so-called hidden node state, and judging that influence of interference provided by the signal transmitted from the other system communication device 200 to the reception processing of the wireless LAN communication device 100b is not large. By this means, the wireless LAN communication device 100a can prevent the communication speed from being reduced by the RTS frame being retransmitted after the received power exceeding the predetermined threshold has been no longer detected.

Figure 18:
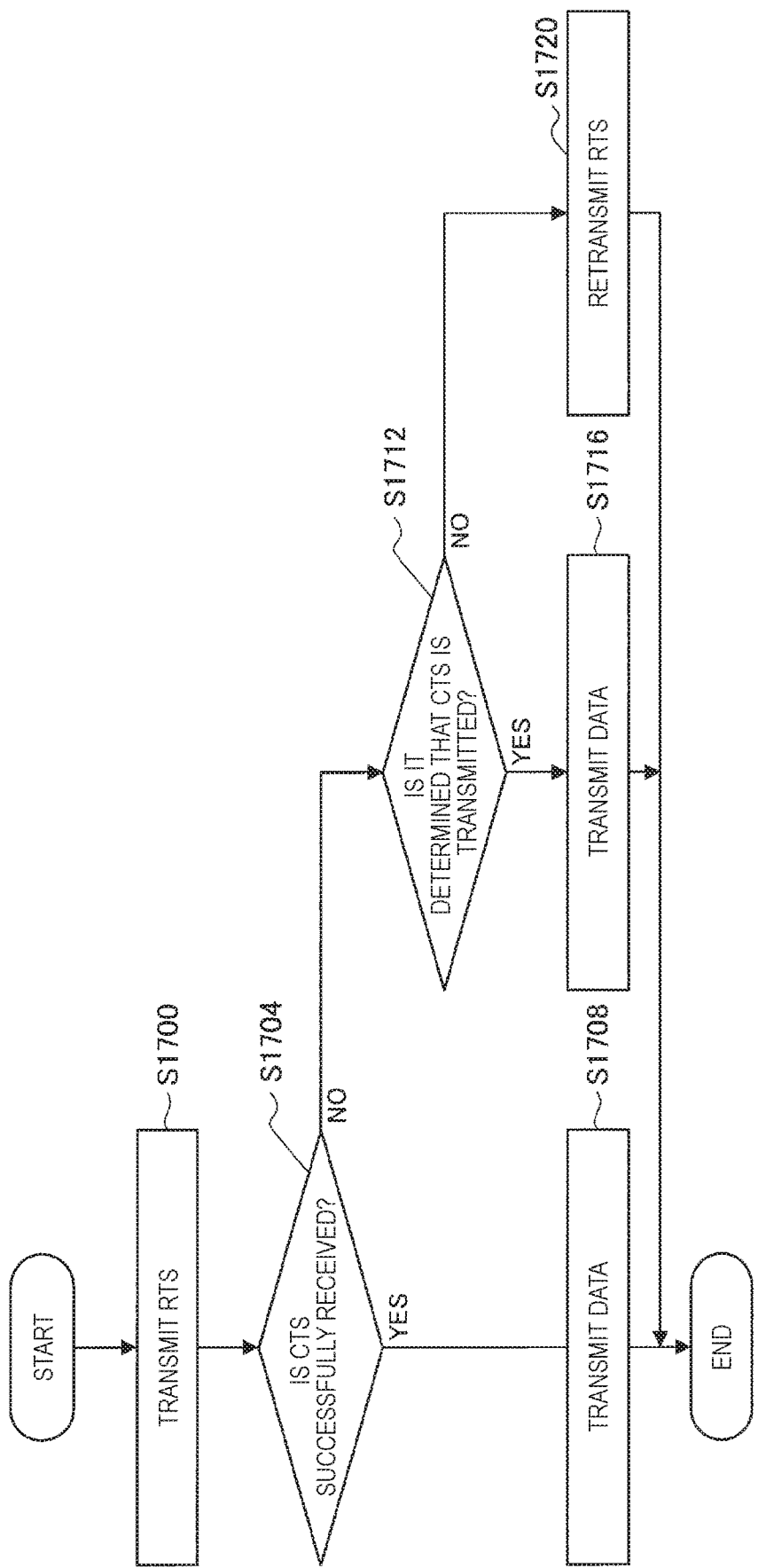
FIG. 18 is a flowchart illustrating operation in the case where the present disclosure is utilized for detection of a CTS frame.

Here, operation in the case where the present disclosure is utilized for detection of the CTS frame will be described with reference to FIG. 18. FIG. 18 is a flowchart illustrating the operation in the case where the present disclosure is utilized for detection of the CTS frame.

First, in step S1700, the wireless LAN communication device 100a transmits an RTS frame to the wireless LAN communication device 100b. Thereafter, the wireless LAN communication device 100b receives the RTS frame and transmits a CTS frame to the wireless LAN communication device 100a. In the case where the wireless LAN communication device 100a fails in reception of the CTS frame by influence of interference, or the like, in step S1704 (step S1704: No), in step S1712, the wireless LAN communication device 100a determines whether or not the CTS frame is transmitted using a method of one of the above-described first example to fifth example or a method of combination of the first example to the fifth example.

In the case where it is determined that the CTS frame is transmitted (step S1712: Yes), in step S1716, the wireless LAN communication device 100a transmits a data frame even while received power exceeding the predetermined threshold is detected, and the processing is finished. In the case where it is determined that the CTS frame is not transmitted (step S1712: No), in step S1720, the wireless LAN communication device 100a retransmits the RTS after received power exceeding the predetermined threshold has been no longer detected, and the processing is finished. Note that, in the case where the wireless LAN communication device 100a succeeds in reception of the CTS frame without being influenced by interference, or the like, in step S1704 (step S1704: Yes), in step S1708, the wireless LAN communication device 100a transmits a data frame, and the processing is finished.

(7-3. Case where the Determination Methods are Utilized for Detection of Trigger-Based PPDU)

Figure 19:
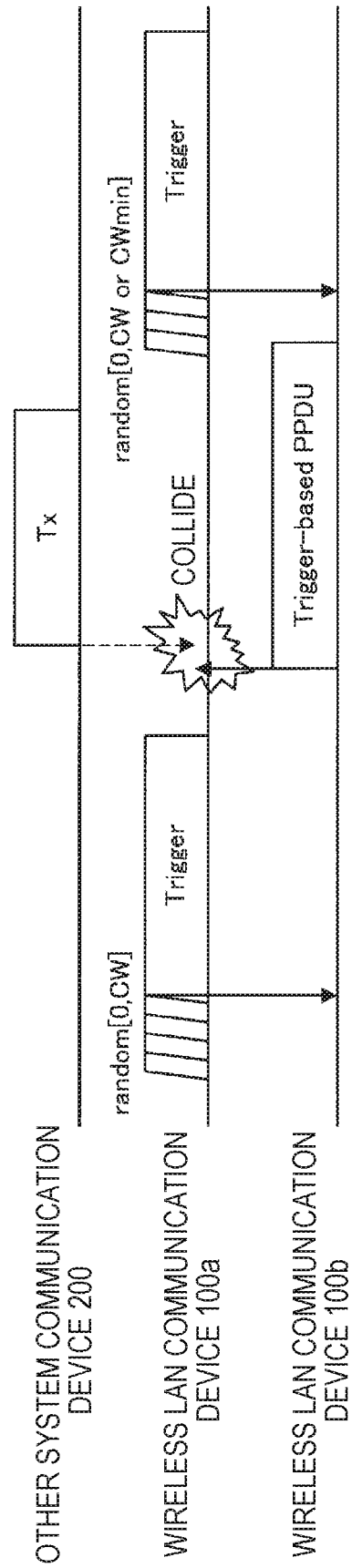
FIG. 19 is a diagram illustrating a case where the present disclosure is utilized for detection of a Trigger-based PPDU.

Subsequently, a case where the above-described determination method is utilized for detection of a frame, such as a Trigger-based PPDU, which is transmitted in a form corresponding to a transmission request (hereinafter, referred to as a "Trigger-based PPDU" for convenience) will be described with reference to FIG. 19. FIG. 19 is a diagram illustrating a case where the present disclosure is utilized for detection of the Trigger-based PPDU.

As illustrated in FIG. 19, first, the wireless LAN communication device 100a transmits a trigger frame to the wireless LAN communication device 100b to request a Trigger-based PPDU. The wireless LAN communication device 100b which receives the trigger frame then transmits a Trigger-based PPDU on the basis of various kinds of parameters included in the trigger frame. It is assumed that the wireless LAN communication device 100a fails in reception processing of the Trigger-based PPDU in part of resource units or spatial streams by a signal transmitted from the other system communication device 200 and the Trigger-based PPDU interfering with each other.

In this event, the wireless LAN communication device 100a determines that the Trigger-based PPDU is transmitted using a method of one of the above-described first example to the fifth example or a method of combination of the first example to the fifth example. That is, the wireless LAN communication device 100a determines that the trigger frame is normally received by the wireless LAN communication device 100b.

By this means, the wireless LAN communication device 100a can appropriately perform subsequent communication. For example, the wireless LAN communication device 100a does not increase the CW or keeps the CW at CWmin upon retransmission of the trigger frame to receive the Trigger-based PPDU. By this means, the wireless LAN communication device 100a can reduce a possibility that the waiting period for subsequent transmission of the trigger frame increases. Further, the wireless LAN communication device 100a changes the resource unit or the spatial stream to be used for communication in conjunction with this. By this means, it is possible to reduce a possibility of occurrence of interference by a signal transmitted from the other system communication device 200 upon retransmission of the Trigger-based PPDU.

Figure 20:
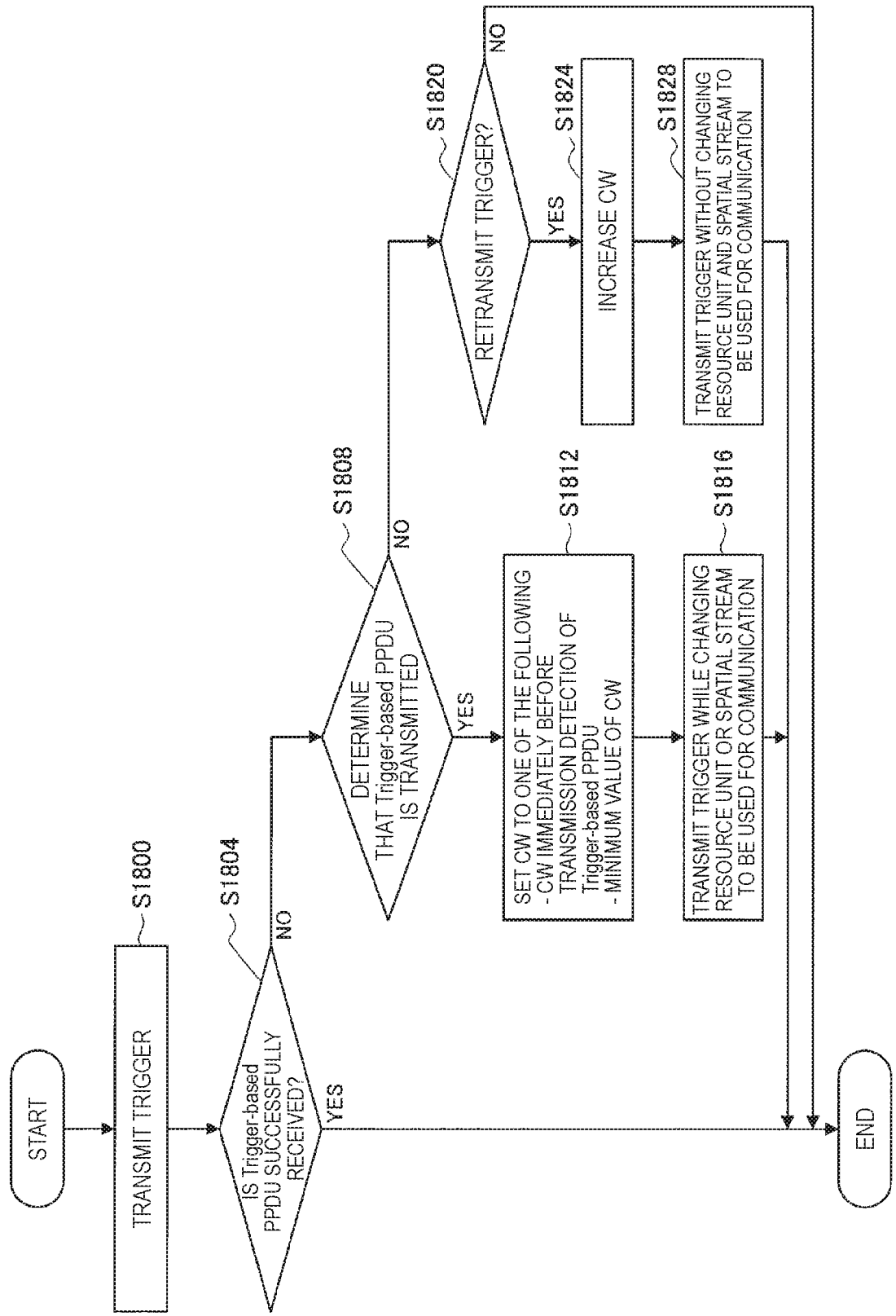
FIG. 20 is a flowchart illustrating operation in the case where the present disclosure is utilized for detection of a Trigger-based PPDU.

Here, operation in the case where the present disclosure is utilized for detection of the Trigger-based PPDU will be described with reference to FIG. 20. FIG. 20 is a flowchart illustrating the operation in the case where the present disclosure is utilized for detection of the Trigger-based PPDU.

First, in step S1800, the wireless LAN communication device 100a transmits a trigger frame to the wireless LAN communication device 100b. Thereafter, the wireless LAN communication device 100b receives the trigger frame and transmits a Trigger-based PPDU to the wireless LAN communication device 100a. In the case where the wireless LAN communication device 100a fails in reception of the Trigger-based PPDU by influence of interference, or the like, in step S1804 (step S1804: No), in step S1808, the wireless LAN communication device 100a determines whether or not the Trigger-based PPDU is transmitted using a method of one of the above-described first example to fifth example or a method of combination of the first example to the fifth example.

In the case where it is determined that the Trigger-based PPDU is transmitted (step S1808: Yes), in step S1812, the wireless LAN communication device 100a sets a CW immediately before the Trigger-based PPDU is transmitted or CWmin at the CW. Further, in step S1816, the wireless LAN communication device 100a retransmits the trigger frame while changing the resource unit or the spatial stream to be used for subsequent communication.

In the case where it is determined in step S1808 that the Trigger-based PPDU is not transmitted (step S1808: No), and the wireless LAN communication device 100a determines to retransmit the trigger frame (step S1820: Yes), the wireless LAN communication device 100a increases the CW in step S1824 and retransmits the trigger frame without changing the resource unit or the spatial stream to be used for subsequent communication in step S1828. In the case where the wireless LAN communication device 100a determines not to retransmit the trigger frame in step S1820 (step S1820: No), the processing is finished. Note that, in the case where the wireless LAN communication device 100a succeeds in reception of the Trigger-based PPDU without being influenced by interference, or the like, in step S1804 (step S1804: Yes), of course, the wireless LAN communication device 100a does not retransmit the trigger frame, and the processing is finished.

(5-4. Case where the Determination Methods are Utilized for Detection of Beamforming Feedback)

Figure 21:
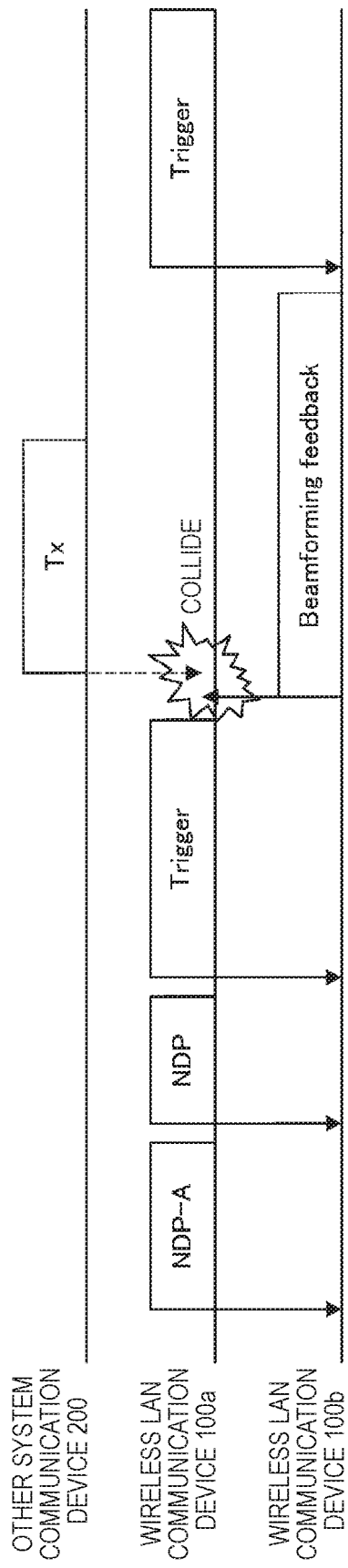
FIG. 21 is a diagram illustrating a case where the present disclosure is utilized for detection of beamforming feedback.

Subsequently, a case where the above-described determination is utilized for detection of a signal (hereinafter, "beamforming feedback" will be described as an example for convenience) such as, for example, beamforming feedback, which is transmitted in a form corresponding to a sounding frame (hereinafter, an "NDP-A frame" and "NDP" will be described as an example for convenience) or a feedback request (hereinafter, a "trigger frame" will be described as an example for convenience) in channel measurement procedure will be described with reference to FIG. 21. More specifically, it is assumed that the wireless LAN communication device 100 can transmit signals to a plurality of devices which are spatially dispersed at the same time using a beamforming technology. FIG. 21 is a diagram illustrating a case where the present disclosure is utilized for detection of the beamforming feedback.

As illustrated in FIG. 21, first, the wireless LAN communication device 100a transmits a null data packet announcement (NDP-A) frame and a null data packet (NDP) to the wireless LAN communication device 100b to perform channel measurement. The wireless LAN communication device 100a then transmits a trigger frame to the wireless LAN communication device 100b to request beamforming feedback. The wireless LAN communication device 100b which receives the trigger frame transmits the beamforming feedback generated on the basis of the NDP to the wireless LAN communication device 100a. It is assumed that the wireless LAN communication device 100a fails in reception processing of the beamforming feedback by a signal transmitted from the other system communication device 200 and the beamforming feedback interfering with each other.

In this event, the wireless LAN communication device 100a determines that the beamforming feedback is transmitted using a method of one of the above-described first example to the fifth example or a method of combination of the first example to the fifth example. That is, the wireless LAN communication device 100a determines that an NDP-A frame, an NDP, and the trigger frame are normally received by the wireless LAN communication device 100b.

By this means, the wireless LAN communication device 100a can appropriately perform subsequent communication. For example, the wireless LAN communication device 100a retransmits only the trigger frame without retransmitting the NDP-A frame and the NDP by determining that the NDP-A frame, the NDP and the trigger frame are received by the wireless LAN communication device 100b and the beamforming feedback is transmitted. By this means, the wireless LAN communication device 100a can prevent channel measurement from being performed again by the NDP-A frame and the NDP being retransmitted. That is, the wireless LAN communication device 100a can improve communication efficiency by omitting unnecessary transmission processing of frames.

Figure 22:
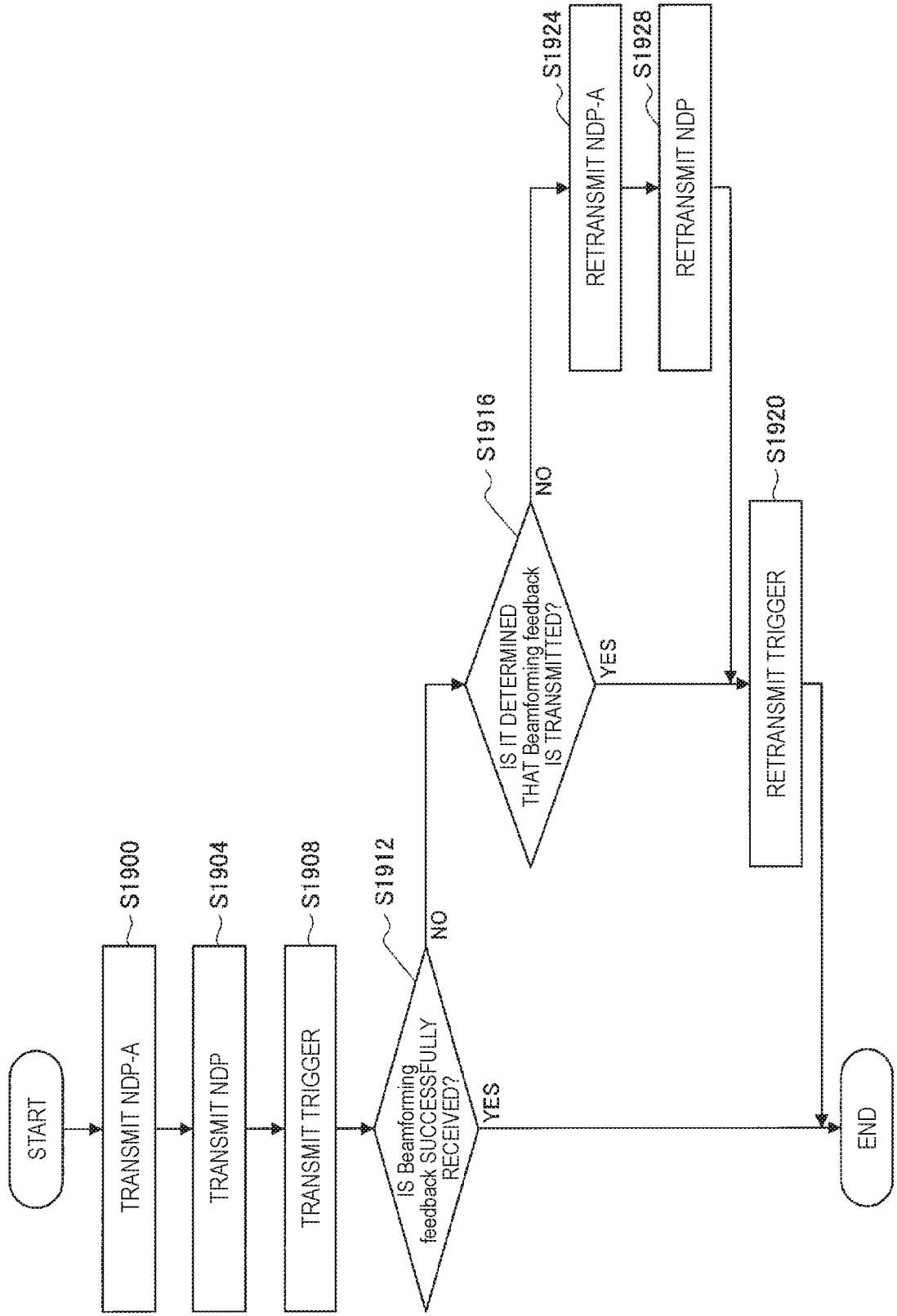
FIG. 22 is a flowchart illustrating operation in the case where the present disclosure is utilized for detection of beamforming feedback.

Here, operation in the case where the present disclosure is utilized for detection of the beamforming feedback will be described with reference to FIG. 22. FIG. 22 is a flowchart illustrating the operation in the case where the present disclosure is utilized for detection of the beamforming feedback.

First, the wireless LAN communication device 100a transmits an NDP-A frame to the wireless LAN communication device 100b in step S1900, and transmits an NDP frame to the wireless LAN communication device 100b in step S1904. Then, in step S1908, the wireless LAN communication device 100a transmits a trigger frame for requesting beamforming feedback to the wireless LAN communication device 100b. Thereafter, the wireless LAN communication device 100b receives these signals and transmits beamforming feedback to the wireless LAN communication device 100a. In the case where the wireless LAN communication device 100a fails in reception of the beamforming feedback by influence of interference, or the like, in step S1912 (step S1912: No), in step S1916, the wireless LAN communication device 100a determines whether or not the beamforming feedback is transmitted using a method of one of the above-described first example to fifth example or a method of combination of the first example to the fifth example.

In the case where it is determined that the beamforming feedback is transmitted (step S1916: Yes), in step S1920, the wireless LAN communication device 100a retransmits only the trigger frame without retransmitting the NDP-A frame and the NDP. In the case where it is determined in step S1916 that the beamforming feedback is not transmitted (step S1916: No), the wireless LAN communication device 100a requests the beamforming feedback again by retransmitting the NDP-A frame in step S1924, retransmitting the NDP in step S1928, and retransmitting the trigger frame in step S1920.

8. Application example

The technology according to the present disclosure can be applied to various products. For example, the wireless LAN communication device 100 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the wireless LAN communication device 100 may be realized as terminals that perform machine to machine (M2M) communication (also referred to as machine type communication (MTC) terminals) such as smart meters, vending machines, remotely controlled monitoring devices, or point of sale (POS) terminals. Furthermore, the wireless LAN communication device 100 may be wireless communication modules mounted in such terminals (for example, integrated circuit modules including one die).

On the other hand, for example, the wireless LAN communication device 100 may be realized as a wireless LAN access point (also referred to as a wireless base station) which has a router function or does not have a router function. The wireless LAN communication device 100 may be realized as a mobile wireless LAN router. The wireless LAN communication device 100 may also be a wireless communication module (for example, an integrated circuit module configured with one die) mounted on such devices.

8-1. First Application Example

Figure 23:
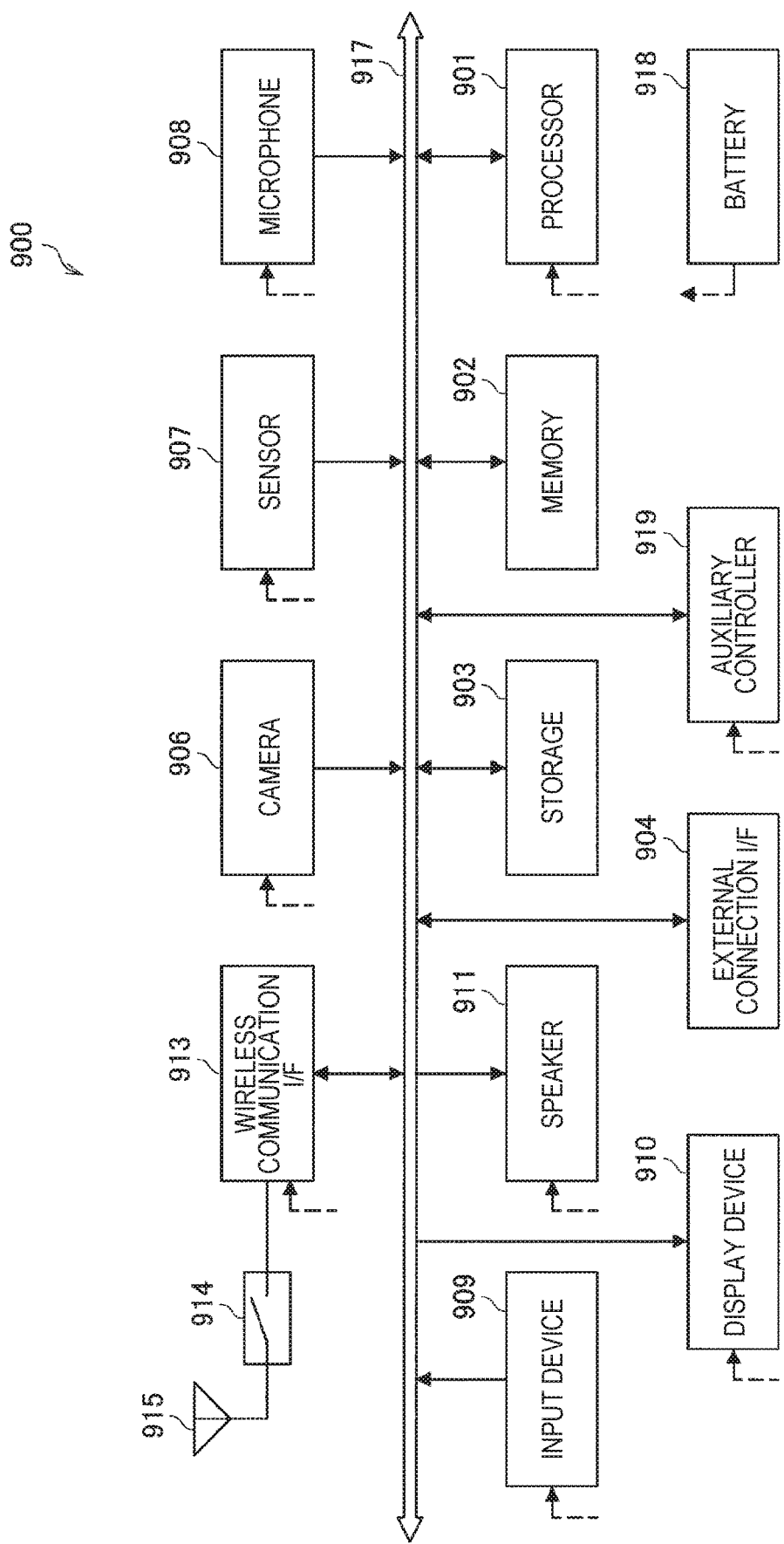
FIG. 23 is a block diagram illustrating an example of a schematic configuration of a smartphone.

FIG. 23 is a block diagram illustrating an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The external connection interface 904 is an interface for connecting an externally attachable device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, 11ad and 11ax, to establish wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals through the wireless communication interface 913.

Note that the smartphone 900 may include a plurality of antennas (for example, antennas for a wireless LAN or antennas for a proximity wireless communication scheme, or the like), without being limited to the example of FIG. 23.

In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 23 via power supply lines partially indicated by dashed lines in the drawing. The auxiliary controller 919 causes, for example, necessary minimum functions of the smartphone 900 to be operated in a sleep mode.

Note that the smartphone 900 may operate as a wireless access point (software AP) as the processor 901 executes the function of an access point at an application level. In addition, the wireless communication interface 913 may have the function of a wireless access point.

8-2. Second Application Example

Figure 24:
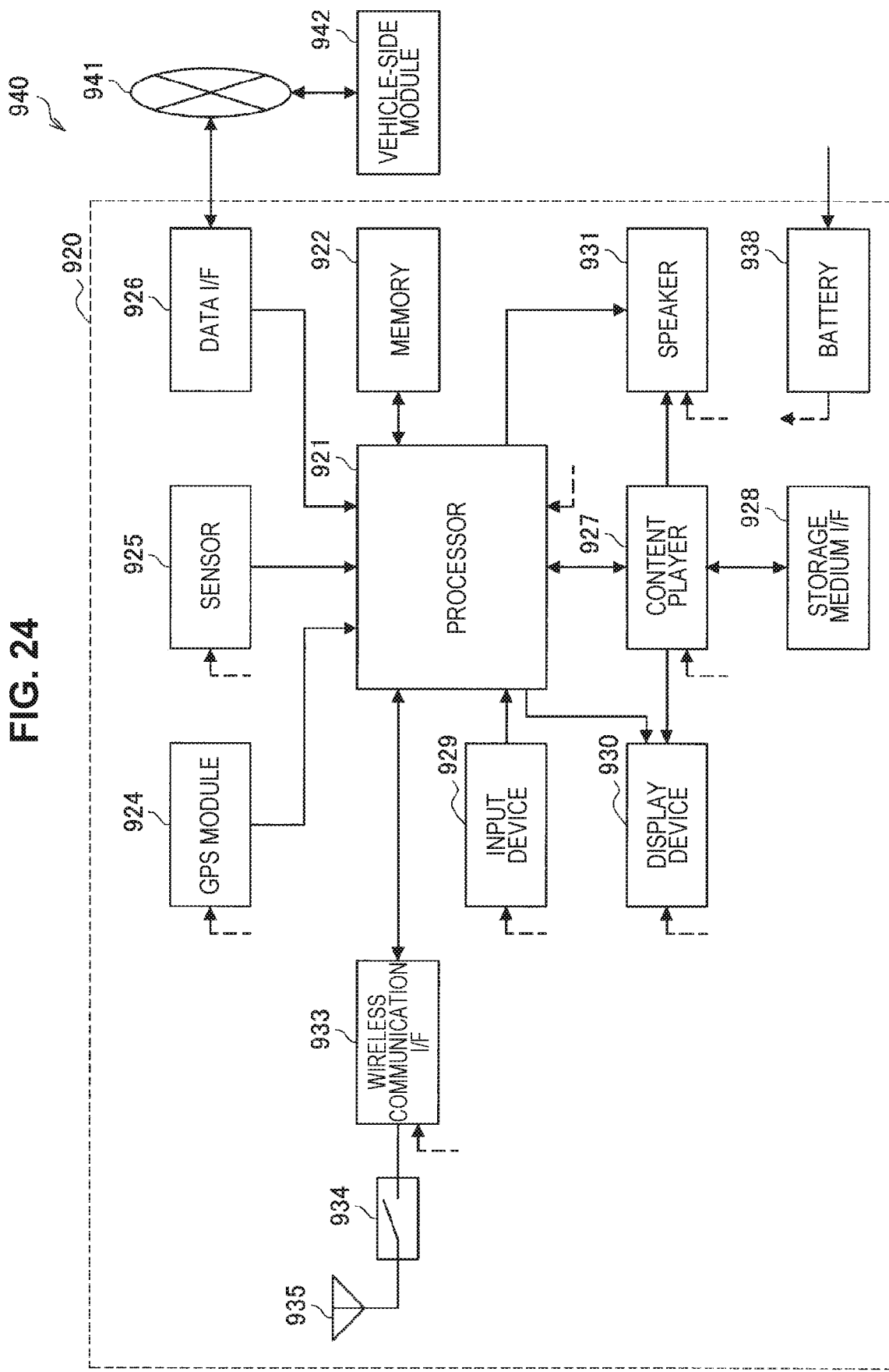
FIG. 24 is a block diagram illustrating an example of a schematic configuration of a car navigation device.

FIG. 24 is a block diagram illustrating an example of a schematic configuration of a car navigation device 920 to which the technology of the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, 11ad, and the like to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 24. In this case, the antenna switch 934 may be omitted from the configuration of the car navigation device 920.

The battery 938 supplies electric power to each of the blocks of the car navigation device 920 illustrated in FIG. 24 via power supply lines partially indicated by dashed lines in the drawing. In addition, the battery 938 accumulates electric power supplied from the vehicle side.

Further, the wireless communication interface 933 may operate as the above-described wireless LAN communication device 100 and may provide wireless connection to a terminal carried by a user who gets in the vehicle.

Further, the technology of the present disclosure may be realized as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

8-3. Third Application Example

Figure 25:
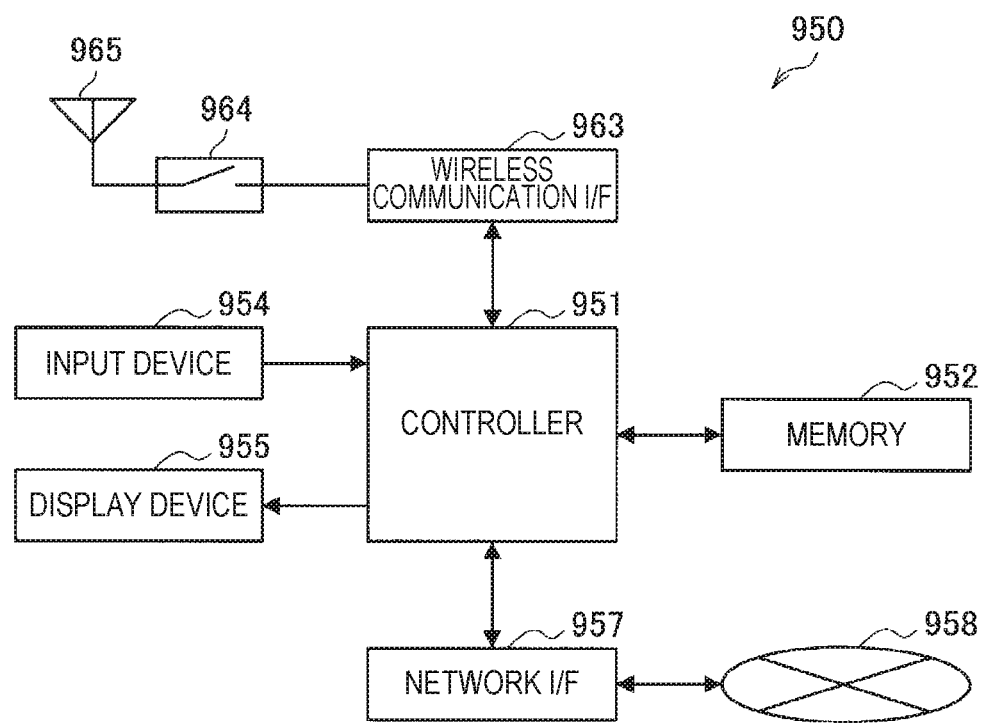
FIG. 25 is a block diagram illustrating an example of a schematic configuration of a wireless access point.

FIG. 25 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, had, and 11ax and the like to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

9. Conclusion

As described above, the wireless LAN communication device 100 according to the present disclosure transmits a predetermined signal (first signal), and, even in the case of failure in reception processing of a signal for response to the signal (second signal), can determine whether or not the signal for response is transmitted on the basis of information acquired in the process of the reception processing. That is, the wireless LAN communication device 100 can determine whether or not at least part of the predetermined signal transmitted by the wireless LAN communication device 100 is received at a transmission destination device. The wireless LAN communication device 100 can then appropriately perform subsequent communication on the basis of the determination.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the respective steps illustrated in the above-described respective flowcharts do not necessarily have to be processed in chronological order along the order described as the flowcharts. That is, the respective steps may be processed in the order different from the order described as the flowcharts or may be processed in parallel.

Further, part of the components of the wireless LAN communication device 100 can be provided outside the wireless LAN communication device 100 as appropriate. Further, part of the functions of the wireless LAN communication device 100 may be embodied by the control unit 130. For example, the control unit 130 may embody part of the functions of the communication unit 110 and the data processing unit 120.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication device including:

a transmitting unit configured to perform transmission processing of a first signal;

a receiving unit configured to perform reception processing of a second signal which responds to the first signal in a predetermined period determined by a time point of the transmission processing; and a determining unit configured to perform determination as to whether or not at least part of the first signal is correctly received at a transmission destination device on the basis of information acquired in process of the reception processing.

(2)

The communication device according to (1), in which the determining unit performs the determination in a case of failure in the reception processing.

(3)

The communication device according to (1) or (2), in which the determining unit performs the determination on the basis of whether or not received power equal to or greater than a predetermined threshold is detected in the period.

(4)

The communication device according to (3), in which the determining unit performs the determination on the basis of whether or not at least part of a predetermined signal pattern included in the second signal is detected.

(5)

The communication device according to any one of (1) to (4), in which the determining unit performs the determination on the basis of whether or not at least part of a signal pattern specific to the second signal is detected.

(6)

The communication device according to any one of (1) to (5), in which the determining unit performs the determination on the basis of information included in a physical layer header of the second signal.

(7)

The communication device according to any one of (1) to (6), in which the determining unit performs the determination on the basis of combination of a frequency band and a spatial stream used in the reception processing.

(8)

The communication device according to any one of (1) to (7), in which the receiving unit performs the reception processing using a plurality of frequency bands, and the determining unit performs the determination on the basis of whether or not the reception processing is successful in part of the plurality of frequency bands.

(9)

The communication device according to any one of (1) to (8), further including:

a control unit configured to, in a case where the first signal is a data frame, and the second signal is an ACK frame, in a case where it is determined that at least part of the first signal is correctly received at a transmission destination device, maintain a value of a contention window for setting a transmission waiting period or set a minimum value.

(10)

The communication device according to any one of (1) to (8), in which, in a case where the first signal is an RTS frame, and the second signal is a CTS frame, the transmitting unit transmits a data frame in a case where it is determined that the first signal is correctly received at a transmission destination device.

(11)
The communication device according to any one of (1) to (8), further including:
a control unit configured to, in a case where the first signal is a signal for requesting transmission to a transmission destination, and the second signal is a signal to be transmitted in response to the signal for requesting the transmission, in a case where it is determined that the first signal is correctly received at a transmission destination device, maintain a value of a contention window for setting a transmission waiting period or set a minimum value.

(12)
The communication device according to (11),
in which, in a case where it is determined that the first signal is correctly received at a transmission destination device, the control unit changes combination of a frequency band and a spatial stream to be used for communication.

(13)
The communication device according to any one of (1) to (8),
in which, in a case where the first signal is a transmission notification of a channel measurement signal, a channel measurement signal or a signal which makes a feedback transmission request of channel measurement, and the second signal is a signal to be transmitted in response to the feedback transmission request,
in a case where it is determined that the first signal is correctly received, the transmitting unit retransmits the signal which makes the feedback transmission request of the channel measurement instead of the transmission notification of the channel measurement signal and the channel measurement signal.

(14)
A communication control method to be executed by a computer, including:
performing transmission processing of a first signal;
performing reception processing of a second signal which responds to the first signal in a predetermined period determined by a time point of the transmission processing; and
performing determination as to whether or not at least part of the first signal is correctly received at a transmission destination device on the basis of information acquired in process of the reception processing.

(15)
A program for causing a computer to realize:
performing transmission processing of a first signal;
performing reception processing of a second signal which responds to the first signal in a predetermined period determined by a time point of the transmission processing; and
performing determination as to whether or not at least part of the first signal is correctly received at a transmission destination device on the basis of information acquired in process of the reception processing.

(16)
A communication device including:
a receiving unit configured to perform reception processing of a first signal;
a generating unit configured to generate a second signal which responds to the first signal; and
a transmitting unit configured to perform transmission processing of the second signal using a predetermined resource indicating that the second signal is a signal which responds to the first signal.

(17)
The communication device according to (16),
in which the resource is expressed with combination of a frequency band and a spatial stream.

(18)
The communication device according to (17),
in which a spatial stream different for each frequency band is used as the resource.

(19)
A communication control method to be executed by a computer, including:
performing reception processing of a first signal;
generating a second signal which responds to the first signal; and
performing transmission processing of the second signal using a predetermined resource indicating that the second signal is a signal which responds to the first signal.

(20)
A program for causing a computer to realize:
performing reception processing of a first signal;
generating a second signal which responds to the first signal; and
performing transmission processing of the second signal using a predetermined resource indicating that the second signal is a signal which responds to the first signal.

REFERENCE SIGNS LIST 100 wireless LAN communication device
110 communication unit
111 amplifier unit
112 wireless interface unit
113 signal processing unit
114 channel estimating unit
115 modulating and demodulating unit
120 data processing unit
130 control unit

The invention claimed is:
1. A communication device, comprising:
a transmitting unit configured to transmit a first signal, wherein the first signal includes a channel measurement signal, a transmission notification of the channel measurement signal, and a feedback transmission request of the channel measurement signal;
a receiving unit configured to perform a reception processing operation of a second signal, wherein
the second signal is, in response to the first signal, in a specific time period, and
the specific time period corresponds to a time point of the transmission of the first signal; and
a determining unit configured to determine whether at least part of the first signal is correctly received at a transmission destination device based on information acquired in process of the reception processing operation,
wherein, in a case of the determination that the first signal is correctly received at the transmission destination device, the transmitting unit is further configured to retransmit only the feedback transmission request of the channel measurement signal, without retransmission of the channel measurement signal and the transmission notification of the channel measurement signal.

2. The communication device according to claim 1, wherein the determining unit is further configured to determine, in a case of failure in the reception processing operation, whether at least part of the first signal is correctly received at the transmission destination device.

3. The communication device according to claim 1, wherein the determining unit is further configured to determine whether at least part of the first signal is correctly received at the transmission destination device based on whether received power one of equal to or greater than a specific threshold is detected in the specific time period.

4. The communication device according to claim 3, wherein the determining unit is further configured to determine whether at least part of the first signal is correctly received at the transmission destination device based on whether at least part of a specific signal pattern included in the second signal is detected.

5. The communication device according to claim 1, wherein the determining unit is further configured to determine whether at least part of the first signal is correctly received at the transmission destination device based on whether at least part of a signal pattern specific to the second signal is detected.

6. The communication device according to claim 1, wherein the determining unit is further configured to determine whether at least part of the first signal is correctly received at the transmission destination device based on information included in a physical layer header of the second signal.

7. The communication device according to claim 1, wherein the determining unit is further configured to determine whether at least part of the first signal is correctly received at the transmission destination device based on a combination of a frequency band and a spatial stream for the reception processing operation.

8. The communication device according to claim 1, wherein
the receiving unit is further configured to perform the reception processing operation using a plurality of frequency bands, and
the determining unit is further configured to determine whether at least part of the first signal is correctly received at the transmission destination device based on whether the reception processing operation is successful in part of the plurality of frequency bands.

9. The communication device according to claim 1, further comprising:
a control unit configured to, in a case where the first signal is a data frame and the second signal is an ACK frame, and based on the determination that at least part of the first signal is correctly received at the transmission destination device, maintain a value of a contention window for at least one of a setting operation of a transmission waiting period or a setting operation of a minimum value.

10. The communication device according to claim 1, wherein, in a case where the first signal is a request to send (RTS) frame, and the second signal is a clear to send (CTS) frame, the transmitting unit is further configured to transmit a data frame based on the determination that the first signal is correctly received at the transmission destination device.

11. The communication device according to claim 1, further comprising:
a control unit configured to, in a case where the first signal is a signal for requesting transmission to the transmission destination device and the second signal is a signal to be transmitted in response to the signal for requesting the transmission, and based on the determination that the first signal is correctly received at the transmission destination device, maintain a value of a contention window for at least one of a setting operation of a transmission waiting period or a setting operation of a minimum value.

12. The communication device according to claim 11, wherein, based on the determination that the first signal is correctly received at the transmission destination device, the control unit is further configured to change combination of a frequency band and a spatial stream for communication.

13. A communication control method, comprising:
transmitting a first signal, wherein the first signal includes a channel measurement signal, a transmission notification of the channel measurement signal, and a feedback transmission request of the channel measurement signal;
performing reception processing of a second signal, wherein
the second signal is, in response to the first signal, in a specific time period, and
the specific time period corresponds to a time point of the transmission of the first signal; and
determining whether at least part of the first signal is correctly received at a transmission destination device based on information acquired in process of the reception processing,
wherein, in a case of the determination that the first signal is correctly received at the transmission destination device, the transmitting unit is further configured to retransmit only the feedback transmission request of the channel measurement signal, without retransmission of the channel measurement signal and the transmission notification of the channel measurement signal.

14. A non-transitory computer-readable medium having stored thereon computer-executable instructions, that when executed by a processor, cause the processor to execute operations, the operations comprising:
transmitting a first signal, wherein the first signal includes a channel measurement signal, a transmission notification of the channel measurement signal, and a feedback transmission request of the channel measurement signal;
performing reception processing of a second signal, wherein
the second signal is, in response to the first signal, in a specific time period, and
the specific time period corresponds to a time point of the transmission of the first signal; and
determining whether at least part of the first signal is correctly received at a transmission destination device based on information acquired in process of the reception processing,
wherein, in a case of the determination that the first signal is correctly received at the transmission destination device, the transmitting unit is further configured to retransmit only the feedback transmission request of the channel measurement signal, without retransmission of the channel measurement signal and the transmission notification of the channel measurement signal.

15. A communication device, comprising:
a receiving unit configured to receive a first signal;
a generating unit configured to generate a second signal in response to the first signal; and
a transmitting unit configured to transmit the second signal based on a specific resource indicating that the second signal is a signal which responds to the first signal, wherein
the specific resource is expressed with a combination of a frequency band and a spatial stream, and
a different spatial stream is associated with each frequency band as a resource.

16. A communication control method to be executed by a computer, comprising:
  receiving a first signal;
  generating a second signal in response to the first signal; and
  transmitting the second signal based on a specific resource indicating that the second signal is a signal which responds to the first signal, wherein
    the specific resource is expressed with a combination of a frequency band and a spatial stream, and
    a different spatial stream is associated with each frequency band as a resource.

17. A non-transitory computer-readable medium having stored thereon computer-executable instructions, that when executed by a processor, cause the processor to execute operations, the operations comprising:
  receiving a first signal;
  generating a second signal in response to the first signal; and
  transmitting the second signal based on a specific resource indicating that the second signal is a signal which responds to the first signal, wherein
    the specific resource is expressed with a combination of a frequency band and a spatial stream, and
    a different spatial stream is associated with each frequency band as a resource.

* * * * *